United States Patent
Yu et al.

(10) Patent No.: US 10,880,198 B2
(45) Date of Patent: Dec. 29, 2020

(54) AGGREGATING TARGETED AND EXPLORATION QUERIES

(71) Applicant: QUALCOMM Incorporated, San Diego, CA (US)

(72) Inventors: Yu-Ting Yu, Somerset, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 14/708,149

(22) Filed: May 8, 2015

(65) Prior Publication Data
US 2016/0330100 A1    Nov. 10, 2016

(51) Int. Cl.
| | | |
|---|---|---|
| H04L 12/751 | (2013.01) | |
| H04L 12/725 | (2013.01) | |
| H04L 29/08 | (2006.01) | |
| H04L 12/721 | (2013.01) | |

(52) U.S. Cl.
CPC ........... H04L 45/02 (2013.01); H04L 45/306 (2013.01); H04L 67/327 (2013.01); H04L 45/12 (2013.01)

(58) Field of Classification Search
CPC ......... H04L 45/02; H04L 45/12; H04L 45/20; H04L 45/306; H04L 67/327
USPC ....................................................... 370/392
See application file for complete search history.

(56) References Cited

U.S. PATENT DOCUMENTS

| | | | | |
|---|---|---|---|---|
| 5,699,350 A | * | 12/1997 | Kraslavsky | H04L 29/06 370/254 |
| 6,092,096 A | * | 7/2000 | Lewis | H04L 45/42 370/396 |
| 6,167,051 A | * | 12/2000 | Nagami | H04L 12/1886 370/395.2 |
| 6,336,129 B1 | * | 1/2002 | Ise | H04L 12/1881 370/235 |

(Continued)

FOREIGN PATENT DOCUMENTS

| | | |
|---|---|---|
| CN | 101128827 A | 2/2008 |
| CN | 104052667 A | 9/2014 |

(Continued)

OTHER PUBLICATIONS

Corradi, A., et al., "Adaptive Context Data Distribution with Guaranteed Quality for Mobile Environments," Wireless Pervasive Computing (ISWPC), 2010 5th IEEE International Symposium on, IEEE, Piscataway, NJ' USA, May 5, 2010 (May 5, 2010), pp. 373-380, XP031827224, ISBN: 978-1-4244-6855-3.

(Continued)

Primary Examiner — Parth Patel
Assistant Examiner — Berhanu D Belete
(74) Attorney, Agent, or Firm — Arent Fox LLP

(57) ABSTRACT

In an aspect of the disclosure, a method, a computer-readable medium, and an apparatus are provided. The apparatus may be a first node. The first node receives a first packet from a second node. The first node determines that the first packet is a query packet requesting a response packet and associated with a first transaction. The first node determines that the first node is a first next hop node associated with the first packet. The first node determines that the query packet includes an indication for a local exploration. The first node delays further routing the first packet.

27 Claims, 10 Drawing Sheets

(56) References Cited

U.S. PATENT DOCUMENTS

| | | | |
|---|---|---|---|
| 6,356,553 B1* | 3/2002 | Nagami | H04L 12/1886 370/395.21 |
| 6,389,023 B1* | 5/2002 | Matsuzawa | H04L 12/4604 370/395.31 |
| 6,498,795 B1* | 12/2002 | Zhang | G06F 17/30864 370/400 |
| 6,798,765 B2 | 9/2004 | Larsson | |
| 7,085,241 B1* | 8/2006 | O'Neill | H04L 45/02 370/254 |
| 7,302,705 B1* | 11/2007 | Boivie | H04L 45/00 380/2 |
| 7,388,869 B2 | 6/2008 | Butehorn et al. | |
| 7,801,070 B2* | 9/2010 | Omae | H04W 40/02 370/315 |
| 7,801,110 B2* | 9/2010 | Anjum | H04L 45/00 370/351 |
| 7,885,268 B2* | 2/2011 | Pong | H04L 45/7457 370/395.32 |
| 8,060,419 B2* | 11/2011 | Doyle | H04M 15/41 705/34 |
| 8,369,364 B2 | 2/2013 | Nakata | |
| 8,913,540 B2 | 12/2014 | Gao et al. | |
| 9,225,641 B2* | 12/2015 | Kaneriya | H04L 12/66 |
| 9,391,777 B2* | 7/2016 | Mahadevan | H04L 9/321 |
| 9,712,649 B2* | 7/2017 | Lopez | H04L 67/327 |
| 9,762,490 B2* | 9/2017 | Valencia Lopez | H04L 63/10 |
| 10,491,519 B2* | 11/2019 | Yin | H04L 45/54 |
| 2003/0065878 A1* | 4/2003 | Krishna | G11C 15/00 711/108 |
| 2003/0067929 A1* | 4/2003 | Matsuzawa | H04L 49/251 370/401 |
| 2003/0091043 A1* | 5/2003 | Mehrotra | H04L 49/30 370/389 |
| 2004/0025018 A1* | 2/2004 | Haas | H04L 45/26 713/168 |
| 2004/0210657 A1* | 10/2004 | Narayanan | H04L 29/06 709/227 |
| 2004/0230666 A1* | 11/2004 | Taboada | H04L 67/02 709/217 |
| 2004/0249682 A1* | 12/2004 | DeMarcken | G06Q 10/02 705/5 |
| 2007/0280108 A1* | 12/2007 | Sakurai | H04L 43/087 370/232 |
| 2009/0031035 A1* | 1/2009 | Dharmaraju | H04W 12/04031 709/230 |
| 2009/0116484 A1* | 5/2009 | Buford | H04L 67/1065 370/392 |
| 2009/0248529 A1* | 10/2009 | Dhanapal | G06Q 30/02 705/14.55 |
| 2009/0268633 A1* | 10/2009 | Pan | H04L 29/12254 370/254 |
| 2009/0288163 A1* | 11/2009 | Jacobson | H04L 47/32 726/22 |
| 2011/0119732 A1* | 5/2011 | Dunn | H04L 63/102 726/1 |
| 2012/0036180 A1* | 2/2012 | Thornton | H04L 67/1023 709/203 |
| 2012/0159176 A1* | 6/2012 | Ravindran | H04L 63/104 713/176 |
| 2012/0226822 A1* | 9/2012 | Norair | H04W 74/0808 709/245 |
| 2012/0236109 A1* | 9/2012 | Hsu | H04L 67/2823 348/14.09 |
| 2012/0317307 A1* | 12/2012 | Ravindran | H04N 21/64746 709/238 |
| 2013/0042317 A1* | 2/2013 | Nakashima | H04L 47/125 726/13 |
| 2013/0077555 A1* | 3/2013 | Gao | H04W 72/044 370/312 |
| 2013/0166695 A1* | 6/2013 | Lee | G06F 17/30206 709/219 |
| 2013/0191536 A1* | 7/2013 | Noldus | H04L 65/1006 709/224 |
| 2013/0219081 A1* | 8/2013 | Qian | H04L 67/327 709/241 |
| 2013/0232259 A1* | 9/2013 | Csaszar | H04L 43/0817 709/224 |
| 2013/0232359 A1 | 9/2013 | Fatemi et al. | |
| 2013/0282860 A1* | 10/2013 | Zhang | H04L 45/306 709/217 |
| 2013/0294354 A1 | 11/2013 | Zhang et al. | |
| 2014/0023072 A1* | 1/2014 | Lee | H04L 45/742 370/389 |
| 2014/0036913 A1* | 2/2014 | Olofsson | H04L 12/1868 370/390 |
| 2014/0195641 A1 | 7/2014 | Wang et al. | |
| 2014/0310375 A1* | 10/2014 | Jeon | H04L 67/2814 709/217 |
| 2014/0328342 A1* | 11/2014 | Berman | H04L 45/24 370/392 |
| 2014/0337460 A1 | 11/2014 | Mohaisen | |
| 2015/0043562 A1* | 2/2015 | Shu | H04W 48/16 370/338 |
| 2015/0139034 A1* | 5/2015 | Kang | H04L 45/245 370/254 |
| 2015/0139166 A1* | 5/2015 | Yao | H04L 12/1859 370/329 |
| 2015/0222479 A1* | 8/2015 | Kim | H04W 28/0236 370/218 |
| 2015/0281079 A1* | 10/2015 | Fan | H04L 12/6418 370/392 |
| 2015/0372947 A1* | 12/2015 | Xuan | H04L 45/72 370/392 |
| 2016/0087881 A1* | 3/2016 | Ge | H04L 45/42 709/244 |
| 2016/0156737 A1* | 6/2016 | Perino | H04L 67/2842 709/238 |
| 2016/0174148 A1* | 6/2016 | Seed | H04W 40/005 370/311 |
| 2017/0019865 A1* | 1/2017 | Wang | H04W 48/14 |
| 2018/0368079 A1* | 12/2018 | Wang | H04W 48/08 |

FOREIGN PATENT DOCUMENTS

| | | | |
|---|---|---|---|
| CN | 104429038 A | 3/2015 | |
| CN | 104604205 A | 5/2015 | |
| EP | 1594278 A1 | 11/2005 | |
| EP | 2120419 A2 | 11/2009 | |
| EP | 2835942 A1 | 2/2015 | |
| JP | 2006121593 A | 5/2006 | |
| WO | 2014194523 A1 | 12/2014 | |
| WO | WO 2015018802 A1 * | 2/2015 | ......... H04L 67/2842 |

OTHER PUBLICATIONS

International Search Report and Written Opinion—PCT/US2016/022576—ISA/EPO—dated May 30, 2016.

* cited by examiner

AGGREGATING TARGETED AND EXPLORATION QUERIES

BACKGROUND

Field

The present disclosure relates generally to communication systems, and more particularly, to techniques of aggregating targeted and exploration queries in an information-centric network (ICN).

Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Query-response transactions are the fundamental element of ICNs. ICN query packets may be routed based on the content identifier instead of host identifiers. However, at a physical (PHY) layer, a medium access control (MAC) layer, or a link layer, it is necessary to indicate an address. Therefore, ICNs may map content identifiers to addresses by various means when a packet is passed to the PHY/MAC/Link layer. There is a need for an improved query mechanism that can reduce resource usage.

SUMMARY

In an aspect of the disclosure, a method, a computer-readable medium, and an apparatus are provided. The apparatus may be a first node. The first node receives a first packet from a second node. The first node determines that the first packet is a query packet requesting a response packet and associated with a first transaction. The first node determines that the first node is a first next hop node associated with the first packet. The first node determines that the query packet includes an indication for a local exploration. The first node delays further routing the first packet.

In another aspect of the disclosure, a method, a computer-readable medium, and an apparatus are provided. The apparatus may be a first node. The first node constructs a query packet requesting a response packet and associated with a first transaction. The query packet includes an indication for a local exploration and an indication for a targeted request. The first node transmits the query packet on a channel shared with a plurality of local nodes.

DETAILED DESCRIPTION

Figure 1:
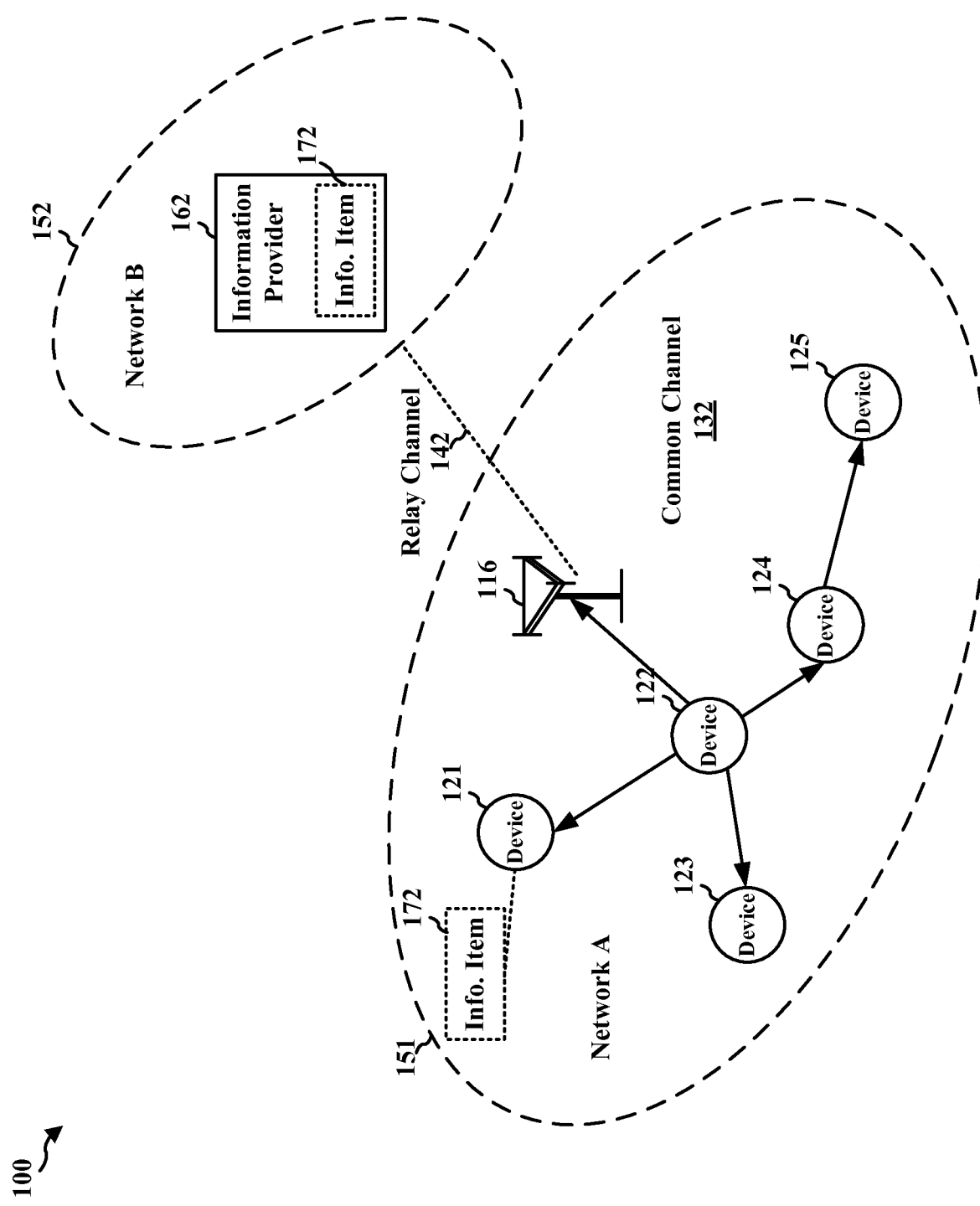
FIG. 1 is a diagram illustrating an ICN system.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method that is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an Institute of Electrical and Electronics Engineers (IEEE) 802.11 protocol using orthogonal frequency-division multiplexing (OFDM), direct sequence spread spectrum (DSSS) communications, a combination of OFDM and DSSS communications, or other schemes. Implementations of the IEEE 802.11 protocol may be used for sensors, metering, and smart grid networks. Advantageously, aspects of certain devices implementing the IEEE 802.11 protocol may consume less power than devices implementing other wireless protocols, and/or may be used to transmit wireless signals across a relatively long range, for example about one kilometer or longer.

In some implementations, a WLAN includes various devices that are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations, a STA may also be used as an AP.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As discussed supra, certain devices described herein may implement the IEEE 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

Query-response transactions are the fundamental element of ICNs. In an ICN, two types of queries may be used: exploration query and targeted query. An exploration query may be used to explore the neighborhood for a response matching the content identifier. A targeted query may be used to send the query packet directly to a target associated with the content identifier. One of the benefits of ICN is its flexibility to achieve both types of query-response transactions without intervention of an application utilizing the ICN. In other words, ICN may allow an application to explore local copies to reduce delay while reliably retrieving contents even if the local copies are non-existent.

ICN query packets may be routed based on the content identifier instead of host identifiers. However, at a physical (PHY) layer, a medium access control (MAC) layer, or a link layer, it is necessary to indicate an address. Therefore, ICNs may map content identifiers to addresses by various means when a packet is passed to the PHY/MAC/Link layer.

In one technique, the exploration query may be implemented by using multicast or broadcast address at the PHY/MAC/Link layer and processing/dropping packets at higher layer for broader exploration. The targeted query may be implemented by using a unicast address of a next hop node by applying destination-based routing with target-address mapping.

In wireless networks, an ICN system may frequently switches between exploration query and targeted query as it is beneficial to explore content availability in local neighborhood first, but traverse a single path for efficient remote content retrieval when the local neighborhood search fails. In certain configurations, an ICN system may require two query transmissions in the case of exploration failure: the first transmission queries a multicast address, and then the second transmission repeats the query with a unicast address of the next hop node. The use of two queries may require extra resource usage for one content retrieval attempt. Thus, there is a need for an improved query mechanism that can reduce resource usage.

In certain configurations, a next hop node and exploration nodes of a querying node share the same communications channel. Thus, the targeted next hop node is able to listen to the responses from the exploration nodes. For example, a small home network where an AP administrated the communication the personal devices in the network may implement such a configuration. In this case, the AP serves as the next hop node and the personal devices are the exploration nodes.

In one technique, an upper layer, e.g., a transmission control protocol (TCP) layer, a user datagram protocol (UDP) layer, or an Internet protocol (IP) layer, at a device may associate the query packet to two addresses at the PHY/MAC/Link layer: an exploration address and a next hop address. Both addresses may be provided by the upper layer. The exploration address indicates the address used for exploration query, e.g., a broadcast address to explore one-hop neighbors. The next hop address indicates the address used for targeted query, e.g., a unicast address of the next-hop relay to the destination.

In one technique, the upper layer may choose to specify: (a) only a next hop address, (b) only an exploration address, or (c) both a next hop address and an exploration address. In the case when both addresses are specified, the PHY/MAC/Link layer of the next hop node delays the processing (e.g., routing) of the query packet for a certain period of time to allow exploration. During the wait time, the next hop node listens to the common channel. If the next hop node receives any response for the query during the wait time, the next hop node drops the query packet. Otherwise, the PHY/MAC/Link layer delivers the query packet to the upper layer for processing (e.g., routing).

These techniques may reduce transmissions destined to two addresses, and consequently reduce the transaction delay for upper layers.

More specifically, in certain configurations, for a query packet the upper layer of a querying node may specify a packet type (i.e., query or response) and at least one of the following as destination: (1) only a next hop address, (2) only an exploration address, and (3) both a next hop address and an exploration address. For a response packet, the upper layer of a responding node may specify the querying node address (i.e., the sender address of the query packet), the next hop address, and a transaction identifier (ID) described infra. In certain configurations with stateful systems, the transmitter and receivers of a response packet may infer the next hop address, the exploration address, and/or the querying node address by using only the transaction ID.

In one technique, the existing Ethernet MAC layer application program interface (API) may be extended as: Enqueue(packet, toAddress, explorationAddress, packetType), where the toAddress is reused to represent the next hop address.

In certain configurations, the next hop node, the querying node, and the potential local responders (specified by the exploration address) share a common transmission channel and the local responders will send the responses via the common channel. Therefore, the PHY/MAC/Link layers of the querying node and the responding node send the query packet or the response packet only once, and the query packets and the response packets each may include two destination addresses. In addition, a mechanism may be implemented to associate the query packet and the response packet to a known transaction.

In the case when only one of next hop address and exploration address is specified by the upper layer, the packet processing procedure at the PHY/MAC/Link layer of a querying node or a responding node may be similar to that of a traditional MAC layer.

A querying node may perform one or more of the following operations: receiving a query packet from the upper layer; receiving a packet type from the upper layer; receiving an exploration address from the upper layer; receiving a next hop address from the upper layer; sending the packet to next hop and exploration address; sending the packet type; sending the relay address; sending the exploration address; sending a querying node address; and receiving a response packet.

An exploration node specified by the exploration address may perform one or more of the following operations: receiving a query packet; receiving a packet type; receiving an exploration address; receiving a next hop address; receiving a querying node address; sending a query packet to the upper layer; receiving a response packet from the upper layer; receiving a packet type from the upper layer; receiving a querying node address from the upper layer; receiving a next hop address from the upper layer; and sending a response packet to next hop and querying node.

A next hop node specified by the next hop address may perform one or more of the following operations: receiving a query packet; receiving a packet type; receiving an exploration address; receiving a next hop address; receiving a querying node address; setting a waiting time for the query packet; buffering query packet; and listening to the common channel. Further, when a response packet is received at the next hop node before the waiting time expires, the next hop node may perform one or more of the following operations: receiving the response packet; receiving the next hop address; dropping the buffered query packet if the next hop address matches its address. When no response packet is received at the next hop node before the wait time expires, the next hop node may send a query packet to the upper layer after the wait time.

FIG. 1 is a diagram 100 illustrating an ICN system. More specially, FIG. 1 illustrates that devices 121-125 and gateway 116 are in a network A 151. The network A 151 has a common channel 132 that is shared by the devices 121-125 and the gateway 116. The devices in the same network (e.g., a local area network (LAN)) may be considered as local to each other. For example, the devices 121-125 and the gateway 116 may be considered as local to each other. The gateway 116 is also in communication with network B 152 through a relay channel 142. Devices in different networks may be considered as remote to each other. For example, the information provider 162 may be considered as remote from the devices 121-125, and vice versa. The network B 152 contains an information provider 162. The information provider 162 stores one or more information items including an information item 172.

In certain configurations, the gateway 116 may be an AP, and the network A 151 may be a WLAN that is administrated by the gateway 116. In certain configurations, the network A 151 may be a wired LAN (e.g., Ethernet) and the gateway 116 may be an edge router that bridges the network A 151 and the network B 152.

Each of the devices 121-125 may seek information items available on the information provider 162. Through network information (e.g., network topology) available and distributed in the network A 151, each of the devices 121-125 may determine a next hop node (e.g., the gateway 116) for transmitting requests to the information provider 162.

A device may send a query directed to an information provider to request an information item. The information provider may in response send a response to the requesting device. The response may include the requested information item, when the item is available at the information provider. The response may alternatively include an indication, such as a negative acknowledgement (NACK), indicating that the requested item is not available at the information provider. The query and the corresponding response may be associated with a transaction. A transaction includes one or more queries and one or more corresponding responses. The queries and responses belong to the same transaction may be assigned the same transaction ID. Further, in one transaction, a query from a requester may be sent to multiple responders. Each responder may send a response back to the requester. The query and the multiple responses have the same transaction ID, indicating that the query and the responses belong to the same transaction.

For example, an upper layer application at the device 121 may desire to request the information item 172 (i.e., a particular item such as a music file A) from the information provider 162 through a query. Accordingly, in a first transaction, the upper layer application at the device 121 may send a first query having a first transaction ID "10101" and directed to the information provider 162 to request a music file A. The information provider 162 receives, via the gateway 116, the query and in response sends a response having the first transaction ID (i.e., "10101") and having a copy the music file A. Subsequently, in a second transaction, an upper layer application at the device 122 may send a second query having a second transaction ID (i.e., "10110") and directed to the information provider 162 to request the music file A. Accordingly, the device 122 may receive, from the information provider 162, a response having the second transaction ID (i.e., "10110") and a copy of the music file A. Further, the query from the device 122 may also be sent to the device 121. As the device 121 previously received the music file A from the information provider 162, the device 121 can also provide the music file A to the device 122. Accordingly, the device 121 may send a response including the requested information item and the second transaction ID (i.e., "10110") to the device 122. The device 122 may consider that the response from any of the device 121 and the information provider 162 fulfills the request, because each response contains the requested particular item (i.e., the music file A) and the second transaction ID (i.e., "10110").

Figure 2:
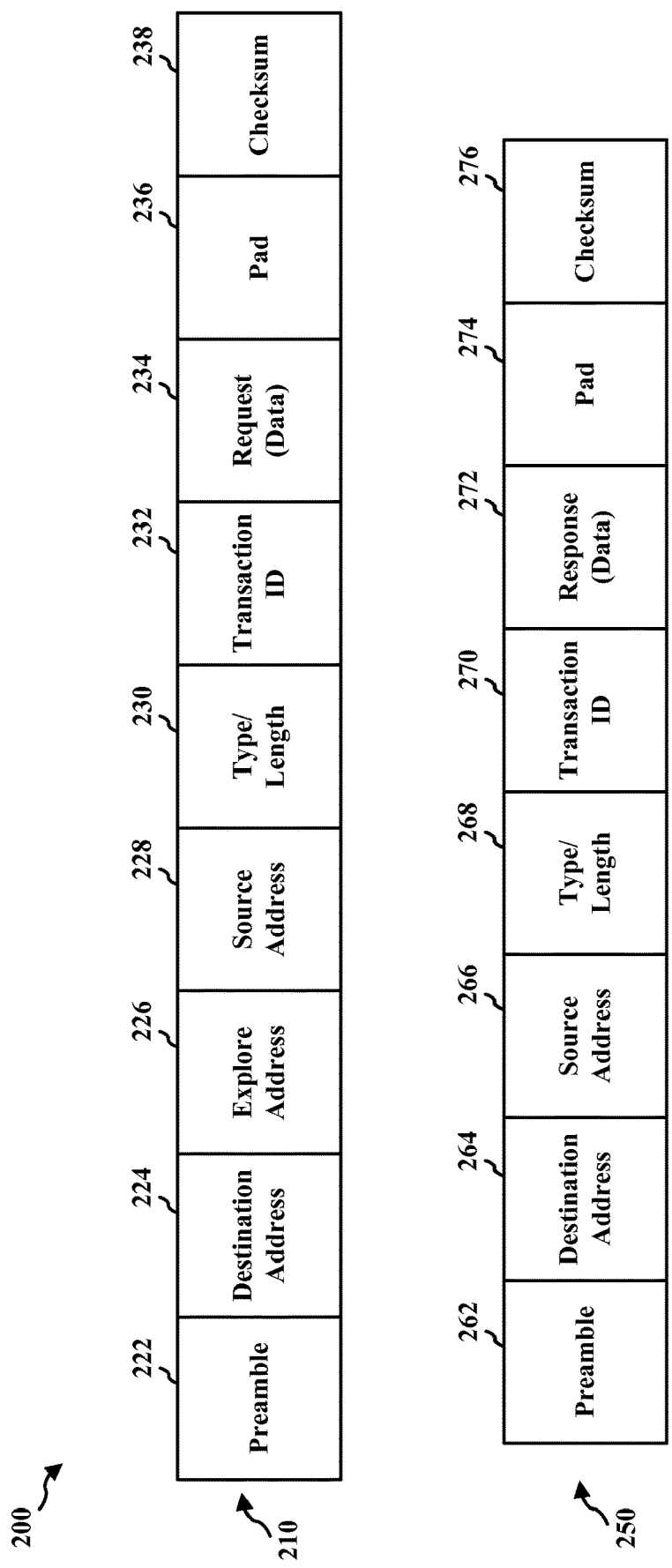
FIG. 2 is a diagram illustrating medium MAC layer packets (frames) used in an ICN system.

FIG. 2 is a diagram 200 illustrating MAC layer packets (frames) used in an ICN system. A MAC layer request packet 210 includes a preamble 222, a destination address field 224, an exploration address field 226, a source address field 228, a type/length field 230, a transaction ID field 232, a request field 234, a pad field 236, and a checksum field 238. A MAC layer response packet 250 includes a preamble 262, a destination address field 264, a source address field 266, a type/length field 268, a transaction ID field 270, a response field 272, a pad field 274, and a checksum field 276.

Referring back to FIG. 1, as described supra, the upper layer application of the device 121 may decide to request a copy of the information item 172. In certain configurations, the upper layer application may decide to explore the exploration neighbors and to request the exploration neighbors to return a copy of the information item 172. The devices of the exploration neighbors are referred to as exploration nodes or explored nodes. The exploration neighbors may have a copy of the information item locally stored. The exploration neighbors may be able to obtain a copy of the information item from a source different from the information provider 162. The source may be a device that is in the network A 151 but is not accessible by the device 121. The source may be in another remote network or a private network available to the exploration neighbors. A copy of an information item provided by a local explored node, which may use various mechanisms (e.g., as described supra) to obtain the copy, may be referred to as a local copy in the description infra.

In certain configurations, the upper layer application may decide to request a remote copy directly from the information provider 162 without exploring the exploration neighbors. In certain configurations, the upper layer application may decide to obtain a copy of the information item 172 by both exploring the exploration neighbors and requesting from the information provider 162.

The upper layer application of the device 121 may construct an upper layer query packet. The upper layer query packet may include the upper layer network addresses of the information provider 162 and the device 121 as well as query information indicating the particular information item 172 (e.g., the music file A) to be obtained from the information provider 162. The upper layer application may also specify a type parameter to indicate that the upper layer query packet is a query type. Based on the query information, the information provider 162 can identify and locate the information item 172. The upper layer application may generate or obtain, e.g., from a server, a first transaction ID (e.g., "10101") for the transaction in which the device 122 is to obtain the information item 172. The upper layer application may include the transaction ID in the upper layer query packet. The upper layer application may send to the MAC layer the upper layer query packet, the transaction ID, and an indication of whether to obtain the information item 172 by exploring the exploration neighbors, by requesting from the information provider 162, or by both.

When the upper layer application decides to obtain the information item 172 by locally exploring the exploration neighbors, the upper layer application also sends, to the MAC layer, information of the exploration neighbors. In certain configurations, the information may be a simple indication such as a flag. Thus, the MAC layer may, upon receiving the indication from the upper layer application, use a preconfigured default address (e.g., a broadcast address) as the MAC address of the exploration neighbors. In certain configurations, the upper layer application may send, to the MAC layer, indications indicating the particular devices of the exploration neighbors, and the MAC layer may accordingly obtain the MAC addresses of those devices. In certain configurations, the upper layer application may send, to the MAC layer, the MAC addresses of the exploration neighbors. The MAC address(es) used to reach the exploration neighbors are referred to as exploration MAC address(es) and may be, among other things, (a) the MAC address of each device of the exploration neighbors, (b) a group index/MAC address directed to all devices of the exploration neighbors, or (c) a broadcast MAC address directed to all the devices on the common channel 132 of the network A 151. When the upper layer application decides to obtain the information item 172 by remotely requesting from the information provider 162, the upper layer application also sends to the MAC layer information (such as identity or MAC address) of the next hop node to be used to reach the information provider 162.

In this example, the upper layer application of the device 121 may desire to obtain the information item 172 by only requesting from the information provider 162. The upper layer application of the device 121 may, based on the network information received from the devices in the network A 151, determine that the gateway 116 is the next hop node in order to send a query to the information provider 162. The upper layer may accordingly provide the MAC address of the gateway 116, which is the next-hop MAC address, to the MAC layer.

The MAC layer of the device 121 receives the upper layer query packet and corresponding indications from the upper layer. The MAC layer then accordingly constructs a MAC layer request packet 210 corresponding to the received data.

In general, when the MAC layer of a device receives an indication to obtain an information item by remotely requesting the item from an information provider and the MAC address of the next hop node, the MAC layer includes the MAC address of the next hop node in the destination address field 224. When the MAC layer of the device receives an indication to obtain the information item by locally exploring the exploration neighbors and the exploration MAC address(es) of the exploration neighbors, the MAC layer includes the exploration MAC address(es) in the exploration address field 226. Further, the MAC layer of the device may receive indications to obtain the information item by both local exploration and remote request. The MAC layer, accordingly, includes both the next-hop MAC address and the exploration MAC address(es) in the MAC layer request packet 210.

In this example, because the MAC layer of the device 121 is instructed by the upper layer application to obtain the information item 172 from the information provider 162 but not through local exploration, the MAC layer may include the next-hop MAC address (i.e., the MAC address of the gateway 116) in the destination address field 224 and include no information in the exploration address field 226. Further, the MAC layer of the device 121 specifies in the type/length field 230 that the MAC layer request packet 210 is a query type. The MAC layer includes the upper layer query packet in the request field 234 and includes the transaction ID in the transaction ID field 232. The MAC layer also accordingly prepares data for the preamble 222, the source address field 228, the pad field 236, and the checksum field 238. As such, the MAC layer of the device 121 constructs the MAC layer request packet 210.

The MAC layer of the device 121 then transmits the MAC layer request packet 210 on the common channel 132. The devices 122-125 may receive the MAC layer request packet 210 on the common channel 132. Because the next-hop MAC address and the exploration MAC address(es) are not directed to any of the devices 122-125, the devices 122-125 may ignore the MAC layer request packet 210.

The gateway 116 also receives the MAC layer request packet 210 on the common channel 132. In this example, the gateway 116 examines the next-hop MAC address and the exploration MAC address(es) in the MAC layer request packet 210, and determines that the exploration MAC address(es) does not exist and that the next-hop MAC address is the address of the gateway 116. Accordingly, the MAC layer of the gateway 116 extracts the upper layer query packet and sends the upper layer query packet to the upper layer. The upper layer of the gateway 116 examines the upper layer query packet and determines that the destination of the upper layer query packet is the information provider 162 and that the information provider 162 is in the network B 152. The upper layer of the gateway 116 then transmits the upper layer query packet to the information provider 162, through a MAC layer of the gateway 116 and the relay channel 142.

In another example, the device 121 may desire to obtain the information item 172 through a local exploration and may include an exploration MAC address(es) (e.g., associated with the devices 122-125) in the MAC layer request packet 210. Upon detecting the exploration MAC address (es), the MAC layer of the gateway 116 may buffer the MAC layer request packet 210 for a preconfigured time period T and may listen to any MAC layer response packet 250 transmitted by the exploration neighbors. Because none of the devices 122-125 has a local copy of the information item 172, the devices 122-125 do not transmit a response packet 250 including the first transaction ID (i.e., "10101") and the information item 172 to the device 121. The gateway 116 accordingly will not detect a MAC layer response packet 250 having the first transaction ID in the preconfigured time period T. Consequently, the gateway 116 further routes the upper layer query packet request included in the MAC layer request packet 210 to the information provider 162.

Subsequently, the information provider 162 receives the upper layer query packet. Based on the query information in the upper layer query packet, the information provider 162 retrieves the information item 172 and then constructs an upper layer response packet. The upper layer response packet may include the transaction ID retrieved from the upper layer query packet and the information item 172. The information provider 162 may also specify a type parameter to indicate that the upper layer response packet is a response type. The information provider 162 then transmits the upper layer response packet to the gateway 116 on the relay channel 142.

The gateway 116 receives the upper layer response packet from the information provider 162. After processing the upper layer response packet, the upper layer of the gateway 116 may store a local copy of the information item 172 extracted from the upper layer response packet using a mechanism that allows the upper layer to identify and locate the information item 172 based on certain query information. The upper layer then sends the upper layer response packet, the next-hop MAC address to the device 121, and the transaction ID to the MAC layer of the gateway 116.

In an optional or alternative configuration, the upper layer further associates the information item 172 with the transaction ID extracted from the upper layer response packet and uses the transaction ID to identify the information item 172. Further, the transaction IDs associated with the local copies may be stored at the MAC layer. In addition, the exploration address, the next hop address, and/or the querying node address associated with each transaction ID may be stored at the MAC layer. Thus, the MAC layer of the gateway 116 may determine whether the upper layer has a local copy associated with a particular transaction ID by examining the transaction IDs stored at the MAC layer.

The MAC layer of the gateway 116 then constructs a MAC layer response packet 250 using the data received. For example, the MAC layer of the gateway 116 includes the upper layer response packet in the response field 272, the MAC address of the device 121 in the destination address field 264, and the transaction ID in the transaction ID field 270. The MAC layer of the gateway 116 specifies in the type/length field 268 that the MAC layer response packet 250 is a response type. The MAC layer of the gateway 116 also accordingly prepares data for the preamble 262, the source address field 266, the pad field 274, and the checksum field 276. As such, the MAC layer of the gateway 116 constructs the MAC layer response packet 250. The gateway 116 then transmits the MAC layer response packet 250 to the device 121 on the common channel 132.

The MAC layer of the device 121 receives the MAC layer response packet 250. Subsequently, the MAC layer extracts the upper layer response packet from the MAC layer response packet 250 and sends the upper layer response packet to the upper layer. Similarly to what was described supra with respect to the upper layer of the gateway 116, the upper layer of the device 121 may store a retrievable local copy of the information item 172 extracted from the upper layer response packet. (In the optional or alternative configuration, the information item 172 is associated with the transaction ID at the device 121, similarly to what was described supra with respect to the upper layer and the MAC layer of the gateway 116.)

Subsequently, another device in the network A 151 may send a query to obtain a copy of the information item 172. Particularly, in this example, the upper layer application of the device 122 may desire to obtain the information item 172 by both requesting from the information provider 162 and exploring the devices 121, 123, 124 and the gateway 116.

The upper layer application of the device 122 may, based on the network information received from the devices in the network A 151, determine that the devices 121, 123, 124 and the gateway 116 are exploration neighbors and that the gateway 116 is the next hop node for sending data to the information provider 162. As described supra, the upper layer application of the device 122 may decide to request a copy of the information item 172 (e.g., the music file A).

The upper layer application of the device 122 may construct an upper layer query packet. The upper layer query packet may include the upper layer network address of the information provider 162 and query information indicating the particular information item 172 (e.g., the music file A) to be obtained from the information provider 162. Based on the query information, the information provider 162 can identify and locate the information item 172. The upper layer application may generate or obtain, e.g., from a server, a second transaction ID (e.g., "10110") for the transaction in which the device 122 is to obtains the information item 172. The upper layer application may include the transaction ID in the upper layer query packet. The upper layer application may also specify a type parameter to indicate that the upper layer query packet is a query type. (In the optional or alternative configuration, the upper layer application may obtain, e.g., from a server, the first transaction ID (e.g., "10101") that is associated with the information item 172. This first transaction ID was used by the device 121 to obtain a copy of the information item 172 from the information provider 162.)

The MAC layer of the device 122 receives the upper layer query packet and corresponding indications from the upper layer. The MAC layer then accordingly constructs a MAC layer request packet 210 corresponding to the received data. As the MAC layer receives an indication to obtain the information item 172 by remotely requesting from the information provider 162 and receives the MAC address of the next hop node, which is the gateway 116 in this example, the MAC layer includes the MAC address of the gateway 116 in the destination address field 224. As the MAC layer of the device 122 also receives an indication to obtain the information item 172 by locally exploring the exploration neighbors and receives the exploration MAC address(es) associated with the exploration neighbors, which are the devices 121, 123, 124 and the gateway 116 in this example, the MAC layer may include the exploration MAC address(es) in the exploration address field 226.

The MAC layer of the device 121 specifies in the type/length field 230 that the MAC layer request packet 210 is a query type. The MAC layer of the device 122 further includes the upper layer query packet in the request field 234 as well as includes the second transaction ID in the transaction ID field 232. (In the optional or alternative configuration, the transaction ID field 232 includes the first transaction ID.) The MAC layer also accordingly prepares data for the preamble 222, the source address field 228, the pad field 236, and the checksum field 238. As such, the MAC layer of the device 122 constructs the MAC layer request packet 210.

The MAC layer of the device 122 transmits the MAC layer request packet 210 on the common channel 132. The devices 121, 123, 124 and the gateway 116 subsequently receive the MAC layer request packet 210 on the common channel 132. The MAC layer of the gateway 116 examines the destination address field 224 and the exploration address field 226 of the MAC layer request packet 210. In this example, the destination address field 224 contains the MAC address of the gateway 116 and the exploration address field 226 contains the MAC address(es) targeting the devices 121, 123, 124 and the gateway 116. Accordingly, the MAC layer of the gateway 116 learns those MAC addresses.

In certain configurations, when the MAC layer of the gateway 116 detects that the next-hop MAC address contained in the destination address field 224 is the MAC address of the gateway 116 and that the exploration address field 226 contains exploration MAC address(es), the MAC layer does not immediately send the upper layer query packet included in the request field 234 to the upper layer for further routing (e.g., determining the destination of the upper layer query packet and the next hop node in order to reach that destination as well as transmitting the upper layer query packet to the next hop node). The MAC layer of the gateway 116 determines whether the exploration MAC address(es) is directed to the gateway 116. If the exploration MAC address(es) is directed to the gateway 116 (e.g., the exploration MAC address(es) is a group MAC address that the gateway 116 is configured to listen to), the gateway 116 determines that the device 122 requests the targeted exploration neighbors (including the gateway 116 in this example) to locate a local copy of the information item 172.

Accordingly, the MAC layer of the gateway 116 may send the upper layer query packet to the upper layer for locating a local copy of the information item 172 (e.g., using a process for locating local copies that is separate from the process for routing). In certain configurations, the MAC layer may send an indication for exploration to the upper layer. For example, the MAC layer may remove the next hop address from the upper layer query packet. Thus, the upper layer knows that the request is for local exploration and refrains from starting a new MAC layer request for routing when the upper layer cannot obtain a local copy. More specifically, when the gateway 116 is also one of the exploration nodes, the MAC layer of the gateway 116 may duplicate and buffer a copy of the upper layer query packet, and may then send the upper layer query packet and exploration indication to the upper layer. Subsequently, if the upper layer responds with a response packet having the same transaction ID, the MAC layer may discard the duplicated copy buffered at the MAC layer. If upper layer does not respond within a preconfigured or random waiting time, the MAC layer may send the buffered copy to the upper layer for routing.

The upper layer may extract the query information from the upper layer query packet and may use the query information to determine whether the upper layer has a copy of the information item 172 locally stored or whether the upper layer can obtain a copy from another source, which is different from the information provider 162. (In the optional or alternative configuration, the MAC layer of the gateway 116 may use the transaction IDs stored at the MAC layer, as described supra, to determine whether the upper layer has a local copy identified by the transaction ID in the MAC layer request packet 210. The upper layer in turn attempts to locate a local copy of the information item 172 stored on the upper layer using the transaction ID.)

In this example, as described supra, the gateway 116 has, at the upper layer, a local copy of the information item 172. Accordingly, the upper layer of the gateway 116 retrieves the local copy of the information item 172 and then constructs an upper layer response packet. The upper layer response packet includes the transaction ID retrieved from the upper layer query packet and the information item 172. The information provider 162 also specifies a type parameter to indicate that the upper layer response packet is a response type. The upper layer of the gateway 116 then sends the upper layer response packet, the next-hop MAC address to the device 122, and the second transaction ID (e.g., "10110") to the MAC layer. (In the optional or alternative configuration, the first transaction ID (e.g., "10101") is used instead of the second transaction ID.)

The MAC layer of the gateway 116 then constructs a MAC layer response packet 250 including, among other things, the next-hop MAC address (i.e., the MAC address of the device 122 in this example) and the upper layer response packet, similarly to what was described supra with respect to gateway 116. The gateway 116 then transmits the MAC layer response packet 250 on the common channel 132.

In another example, the gateway 116 does not have a local copy of the information item 172. Alternatively, the gateway 116 determines that the MAC layer response packet 250 contains exploration MAC address(es) not directed to the gateway 116. The gateway 116 further determines that the next-hop MAC address indicated in the MAC layer response packet 250 is the MAC address of the gateway 116. The gateway 116 waits for a preconfigured time period T. During the preconfigured time period T, the MAC layer of the gateway 116 does not send the upper layer query packet in the MAC layer request packet 210 to the upper layer for routing and buffers the upper layer query packet at the MAC layer of the gateway 116. During the preconfigured time period T, the MAC layer of the gateway 116 then attempts to detect, on the common channel 132, a MAC layer response packet 250 having the second transaction ID. When the MAC layer of the gateway 116 detects such a MAC layer response packet 250, the MAC layer of the gateway 116 may deem that the device 122 can receive, from the exploration neighbors of the device 121, at least one MAC layer response packet 250 having a copy of the information item 172. Consequently, the MAC layer of the gateway 116 may drop the upper layer query packet associated with the transaction ID, which has been buffered at the MAC layer.

In another configuration, the MAC layer of the gateway 116 does not buffer the upper layer query packet at the MAC layer and, upon receiving and processing the MAC layer request packet 210, sends the upper layer query packet in the MAC layer request packet 210 to the upper layer for routing. While waiting for the response packet transmitted from the information provider 162, the MAC layer of the gateway 116 attempts to detect, on the common channel 132, a MAC layer response packet 250 having the second transaction ID. When the MAC layer of the gateway 116 detects such a MAC layer response packet 250 on the common channel 132, the MAC layer may drop a response packet subsequently received from the information provider 162, instead of sending the response packet to the device 122.

Further, the device 121 and the devices 123-124, i.e., the other devices of the exploration neighbors, also receive the MAC layer request packet 210. Particularly, the MAC layer of the device 121, upon receiving the MAC layer request packet 210, examines the next-hop MAC address in the destination address field 224 and the exploration MAC address(es) in the exploration address field 226 of the MAC layer request packet 210. The MAC layer of the device 121 determines that the next-hop MAC address is not directed to the device 121. The MAC layer of the device 121 also determines that the exploration MAC address(es) is directed to the device 121 and, in response, extracts, among other things, the upper layer query packet and the transaction ID from the MAC layer request packet 210.

The MAC layer then sends, among other things, the upper layer query packet to the upper layer application of the device 121. The upper layer may extract the query information from the upper layer query packet and may use the query information to determine whether the upper layer has a copy of the information item 172 locally stored or whether the upper layer can obtain a copy from another source, which is different from the information provider 162. In this example, as described supra, the device 121 has, at the upper layer, a local copy of the information item 172. (In the optional or alternative configuration, the MAC layer of the device 121 may use the transaction IDs stored at the MAC layer, as described supra, to determine whether the upper layer has a local copy identified by the transaction ID in the MAC layer request packet 210. The upper layer in turn attempts to locate a local copy of the information item 172 stored on the upper layer using the transaction ID.)

Further, the device 121 is a responding node to the device 122, which sent the MAC layer request packet 210 and is a querying node. From the upper layer query packet, the upper layer application of the device 121 can determine the upper layer address of the querying node (i.e., the device 122). The upper layer application then constructs an upper layer response packet that includes the information item 172 and specifies the upper layer address of the device 121 as an upper layer destination address. The upper layer application may also determine the next-hop MAC address for sending the upper layer response packet to the device 121. The upper layer application of the device 121 then sends the next-hop MAC address and the upper layer response packet to the MAC layer. The MAC layer of the device 121 then constructs a MAC layer response packet 250 including, among other things, the next-hop MAC address (i.e., the MAC address of the device 122 in this example) and the upper layer response packet, similarly to what was described supra with respect to gateway 116. The MAC layer of the device 121 then transmits the MAC layer response packet 250 having the second transaction ID on the common channel 132. (In the optional or alternative configuration, the first transaction ID (e.g., "10101") is used instead of the second transaction ID.)

Similarly, the MAC layer of the device 123, upon receiving the MAC layer request packet 210 from the device 122, examines the next-hop MAC address in the destination address field 224 and the exploration MAC address(es) in the exploration address field 226 of the MAC layer request packet 210. The MAC layer of the device 123 determines that the next-hop MAC address is not directed to the device 123. The MAC layer of the device 123 also determines that the exploration MAC address(es) is directed to the device 123 and, in response, extracts, among other things, the upper layer query packet and the transaction ID from the MAC layer request packet 210.

The MAC layer sends, among other things, the upper layer query packet to the upper layer application of the device 123. In this example, the upper layer application of the device 123 determines that it cannot obtain a copy of the requested item. The device 123 is not a responding node to the device 122, which sent the MAC layer request packet 210 and is a querying node. Consequently, the device 123 may not respond to the MAC layer request packet 210 received from the device 122. Further, in this example, the device 124 is not a responding node to the device 122, either. The device 124 may not respond to the MAC layer request packet 210 received from the device 122. (In the optional or alternative configuration, the MAC layer of the device 123 may use the transaction IDs stored at the MAC layer, as described supra, to determine whether the upper layer has a local copy identified by the transaction ID in the MAC layer request packet 210. In this example, the MAC layer of the device 123 determines that the stored transaction IDs do not include the transaction ID in the MAC layer request packet 210. Accordingly, the MAC layer may drop the MAC layer request packet 210.)

Figure 3:
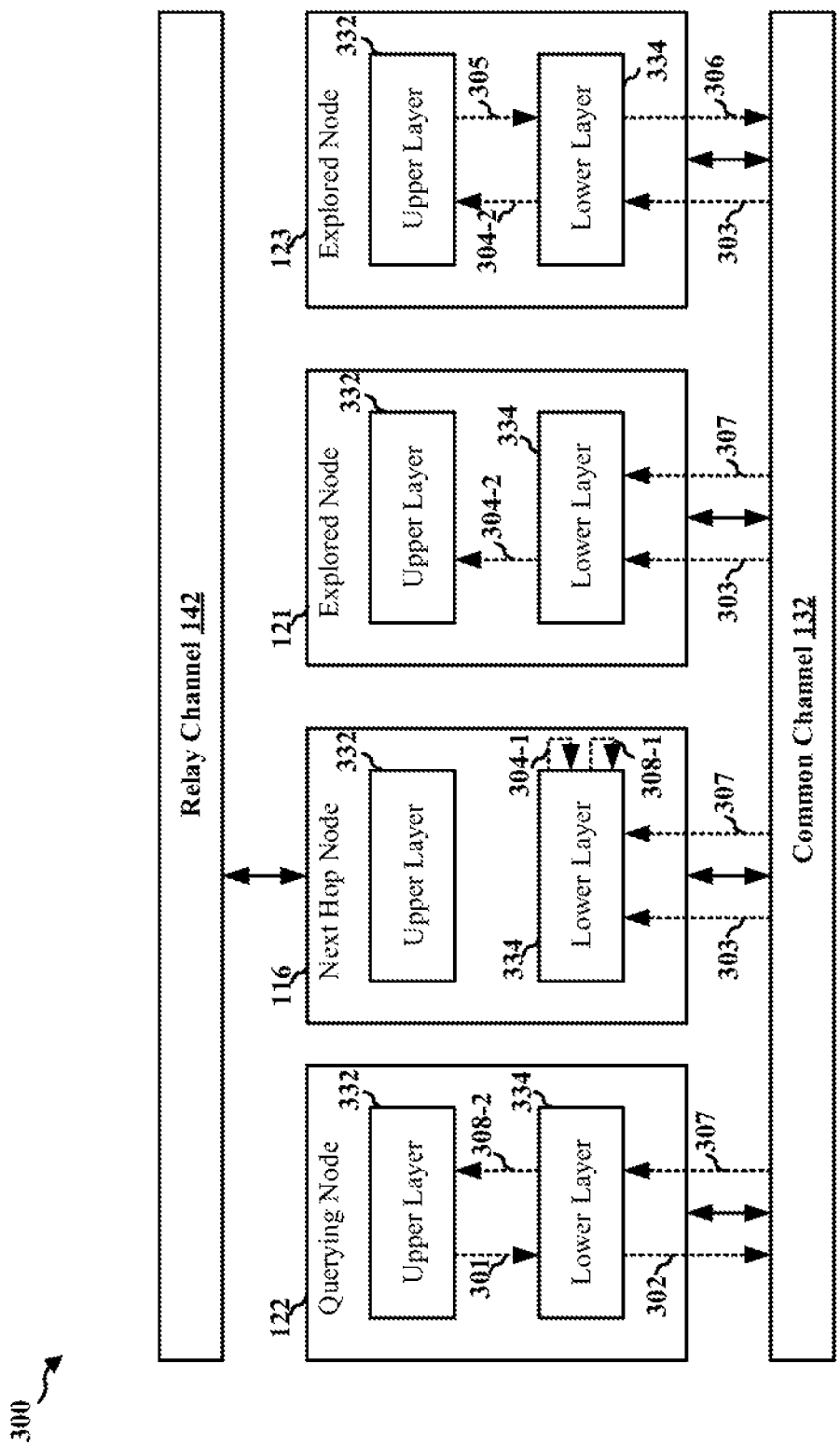
FIG. 3 is a diagram illustrating packet communications among devices utilizing query-response transactions.

FIG. 3 is diagram 300 illustrating packet communications among devices utilizing query-response transactions. Each of the devices 121-123 and the gateway 116 has an upper layer 332 and a lower layer 334. At operation 301, the upper layer 332 (e.g., the UDP/TCP/IP layer) of the device 122 (i.e., the querying node) constructs an upper layer query packet and specifies a type parameter to indicate that the upper layer query packet is a query type. The upper layer query packet requests the information item 172. The upper layer 332 also determines the next-hop MAC address, the exploration MAC address(es), and the upper layer address of the device 122 (i.e., the address of the querying node). In this example, the next-hop MAC address is the MAC address of the gateway 116. The exploration MAC address(es) is directed to the exploration neighbors including the device 121 and the device 123. The upper layer 332 then sends upper layer query packet to the lower layer 334 (e.g., the PHY/MAC/Link layer).

After constructing a MAC layer request packet 210, at operation 302, the lower layer 334 of the device 122 sends the MAC layer request packet 210 to all the receivers on the common channel 132 in one transmission. The MAC layer request packet 210 includes, among other things, the type parameter, a transaction ID for this transaction, the next-hop MAC address, the exploration MAC address(es), and the MAC address of the device 122, and the upper layer query packet.

At operation 303, all the receivers, including the gateway 116, the device 121, the device 123, receive the MAC layer request packet 210.

At operation 304-1, the lower layer 334 of the gateway 116 (i.e., the next hop node) buffers the MAC layer request packet 210 and sets a wait time, e.g., a preconfigured time period T. At operation 304-2, the lower layers 334 of the device 121 and the device 123 (i.e., the devices associated with the exploration MAC address(es)) extract the upper layer query packet from the MAC layer request packet 210 and send the upper layer query packet and the transaction ID included in the MAC layer request packet 210 to the upper layers 332.

At operation 305, the upper layer 332 of the device 121, which may obtain a copy of the information item 172 and is a responding node as described supra, constructs an upper layer response packet as well as specifies a type parameter to indicate that the upper layer response packet is a response type and the transaction ID received from the lower layer. The upper layer response packet includes the information item 172 and a destination address targeted to the device 122 (i.e., the querying node). The upper layer 332 then may send the upper layer response packet, the next-hop MAC address, the type parameter, and the transaction ID to the lower layer 334.

At operation 306, the lower layer 334 of the device 121 constructs the MAC layer response packet 250 to include the upper layer response packet and other information as described supra. Then, the lower layer 334 of the device 121 sends the MAC layer response packet 250 on the common channel 132 in one transmission.

At operation 307, all receivers on the common channel 132, including the device 122 and the gateway 116, receive the MAC layer response packet 250.

At operation 308-1, the lower layer 334 of the gateway 116, upon receiving the MAC layer response packet 250 on the common channel 132, drops the MAC layer request packet 210. At operation 308-2, the lower layer 334 of the device 122 (i.e., the querying node), upon receiving the MAC layer response packet 250 on the common channel 132, extracts the upper layer response packet and sends the upper layer response packet to the upper layer 332 of the device 121.

Figure 4:
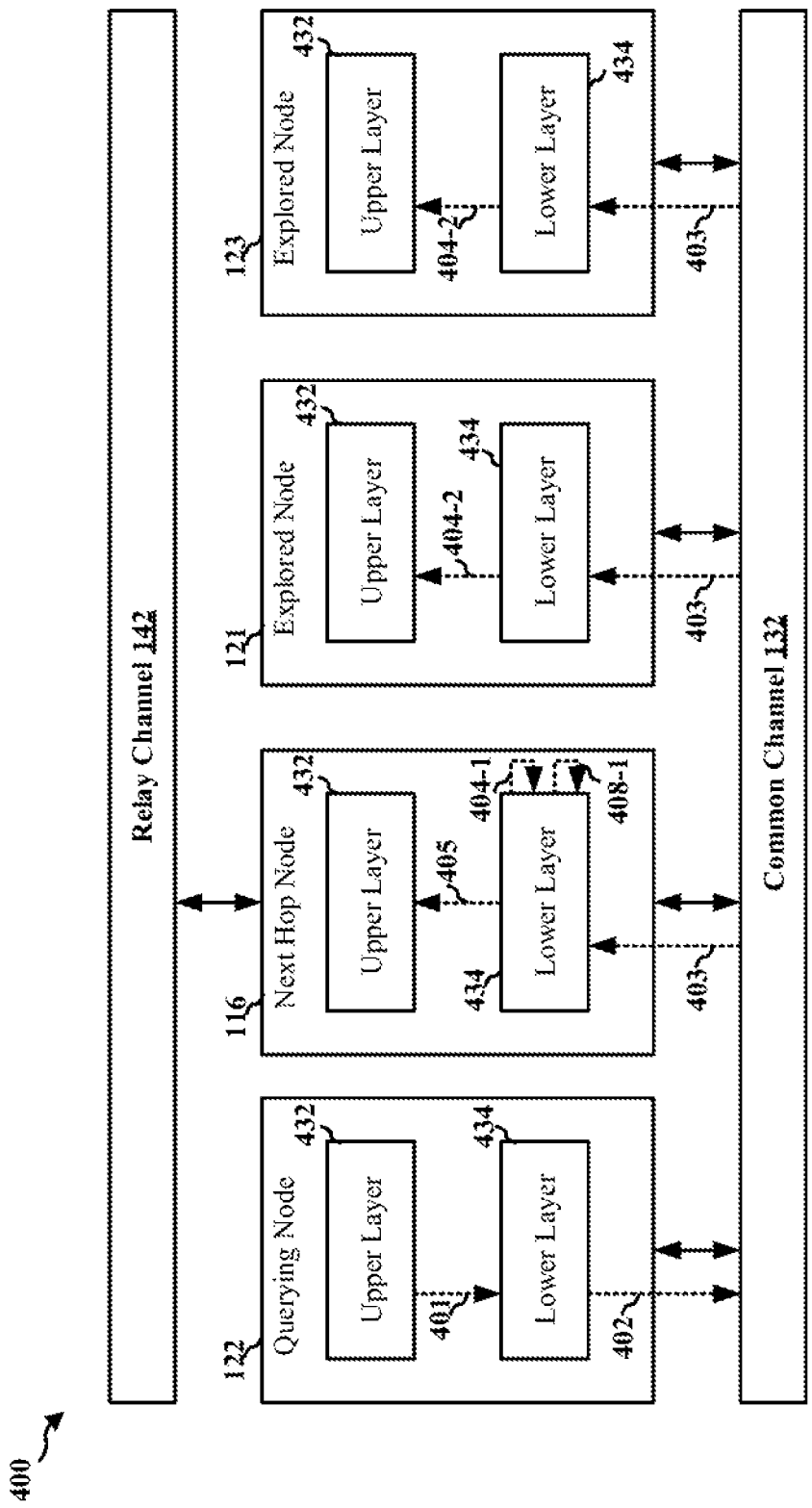
FIG. 4 is another diagram illustrating packet communications among devices utilizing query-response transactions.

FIG. 4 is another diagram 400 illustrating packet communications among devices utilizing query-response transactions. Each of the devices 121-123 and the gateway 116 has an upper layer 432 and a lower layer 434. At operation 401, the upper layer 432 (e.g., the UDP/TCP/IP layer) of the device 122 (i.e., the querying node) constructs an upper layer query packet and specifies a type parameter to indicate that the upper layer query packet is a query type. The upper layer query packet requests the information item 172 associated with a transaction ID. The upper layer 432 also determines the next-hop MAC address, the exploration MAC address(es), and the upper layer address of the device 122 (i.e., the address of the querying node). In this example, the next-hop MAC address is the MAC address of the gateway 116. The exploration MAC address(es) is directed to the exploration neighbors including the device 121 and the device 123. The upper layer 432 then sends upper layer query packet to the lower layer 434 (e.g., the PHY/MAC/Link layer).

After constructing a MAC layer request packet 210, at operation 402, the lower layer 434 of the device 122 sends the MAC layer request packet 210 to all the receivers on the common channel 132 in one transmission. The MAC layer request packet 210 includes, among other things, the type parameter, a transaction ID for this transaction, the next-hop MAC address, the exploration MAC address(es), and the MAC address of the device 122, and the upper layer query packet.

At operation 403, all the receivers, including the gateway 116, the device 121, the device 123, receive the MAC layer request packet 210.

At operation 404-1, the lower layer 434 of the gateway 116 (i.e., the next hop node) buffers the MAC layer request packet 210 and sets a wait time, e.g., a preconfigured time period T. At operation 404-2, the lower layer 434 of the device 121 and the device 123 (i.e., the devices associated with the exploration MAC address(es)) extract the upper layer query packet from the MAC layer request packet 210 and sends upper layer query packet and the transaction ID included in the MAC layer request packet 210 to the upper layer 432.

At operation 405, after the preconfigured time period T, the lower layer 434 of the gateway 116 determines that it has not detected any MAC layer response packet 250 having the transaction ID included in the MAC layer request packet 210 and transmitted on the common channel 132. The lower layer 434 extracts the upper layer query packet from the MAC layer request packet 210 and sends upper layer query packet to the upper layer 432. The upper layer 432 subsequently transmits the upper layer query packet to the information provider 162 through the lower layer 434 and the relay channel 142.

Figure 5:
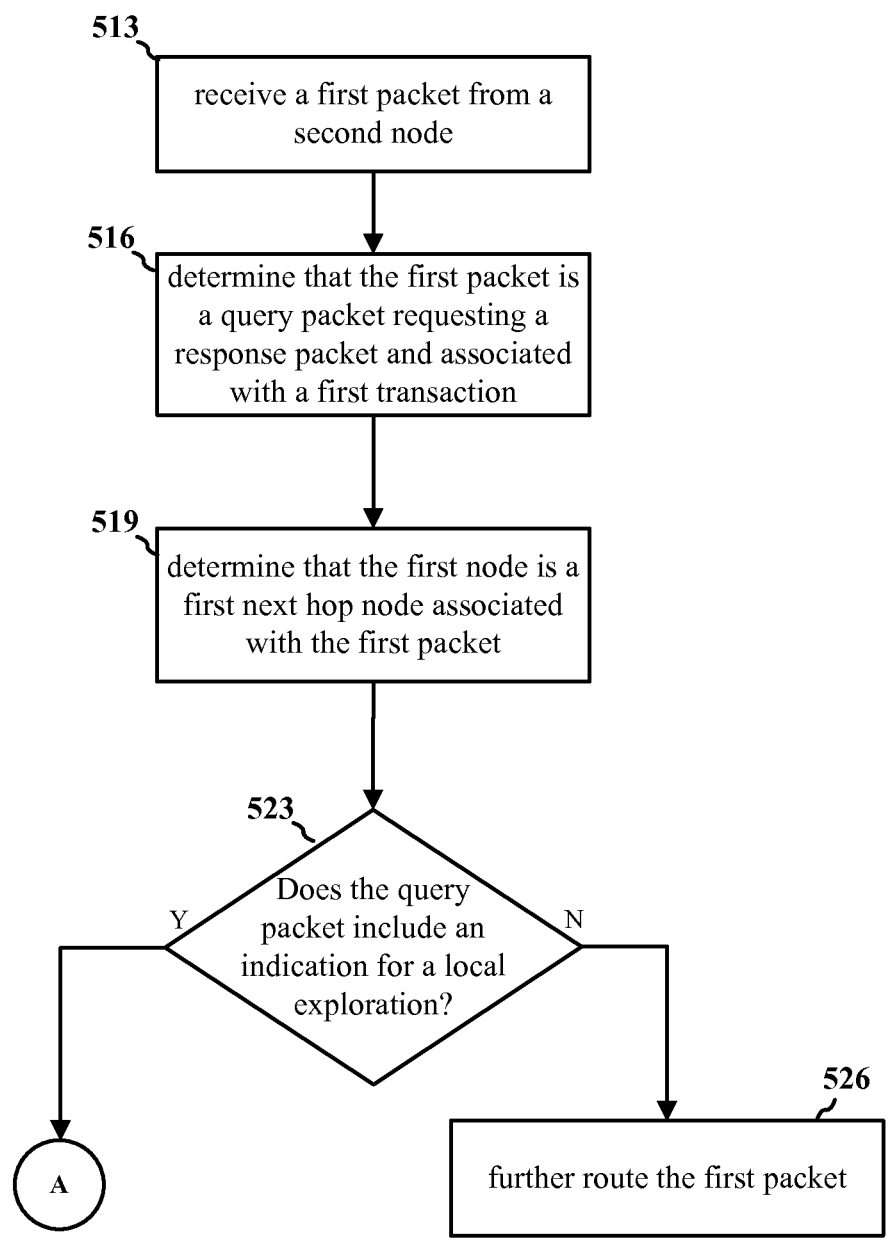
FIG. 5 is a flow chart of a method (process) of processing a query packet.

FIG. 5 is a flow chart 500 of a method (process) of processing a query packet. The method may be performed by a first node (e.g., the devices 121-125 and the gateway 116, the apparatus 902/902').

At operation 513, the first node receives a first packet from a second node. In certain configurations, the query packet includes: an indication of a query; an indication of a first transaction; at least one first address of a first next hop node; and at least one second address of a group of nodes.

For example, referring to FIG. 1, the gateway 116 receives a MAC layer request packet 210 from the device 122.

At operation 516, the first node determines that the first packet is a query packet requesting a response packet and associated with the first transaction. The response packet may have a requested information item or may be a NACK response. In certain configurations, the determination that the first packet is the query packet is based on the indication of the query. For example, referring to FIG. 1, the gateway 116 determines that the MAC layer request packet 210 is such a query packet.

In certain configurations, the determination that the first packet is the query packet is performed at a lower layer of the first node. The lower layer is a physical (PHY) layer, a medium access control (MAC) layer, or a LINK layer.

At operation 519, the first node determines that the first node is the first next hop node associated with the first packet. In certain configurations, the determination that the first node is the first next hop node is based on the first address. For example, referring to FIG. 1, the gateway 116 determines that it is the next hop node to the device 122 for sending a request to the information provider 162.

At operation 523, the first node determines whether the query packet includes an indication for a local exploration. For example, referring to FIG. 1, the gateway 116 determines whether the MAC layer request packet 210 includes exploration MAC address(es).

At operation 526, when the first node determines that the query packet does not include an indication for a local exploration, the first node further routes the first packet. For example, referring to FIG. 1, when the MAC layer of the gateway 116 determines that the MAC layer request packet 210 does not include an exploration MAC address(es), the MAC layer of the gateway 116 sends the upper layer packet included in the MAC layer request packet 210 to the upper layer.

Figure 6:
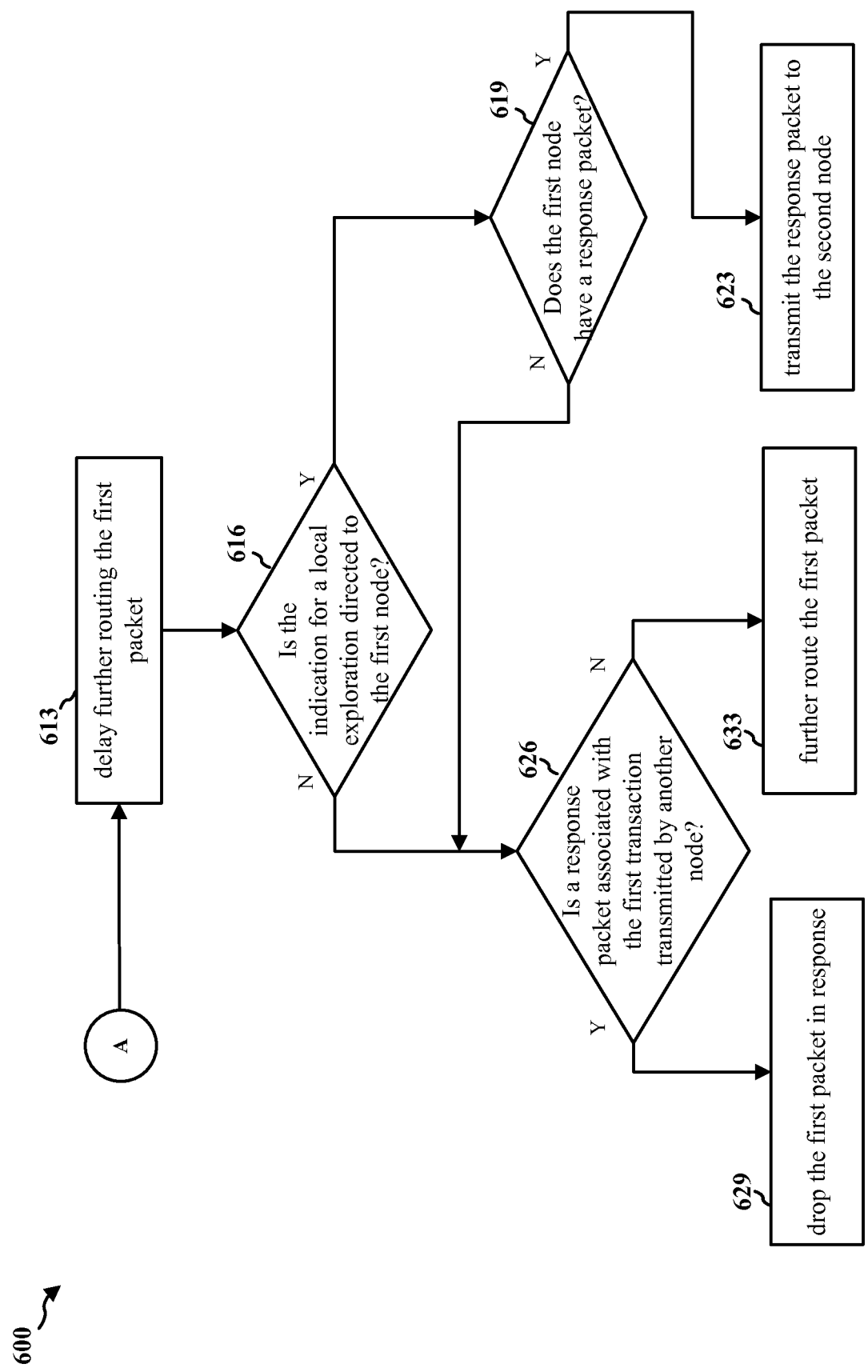
FIG. 6 is a flow chart of a method (process) of local exploration.

When the first node determines that the query packet includes an indication for a local exploration, the process proceeds to operation 613 illustrated in FIG. 6.

FIG. 6 is a flow chart 600 of a method (process) of local exploration. The method may be performed by a first node (e.g., the devices 121-125 and the gateway 116, the apparatus 902/902') subsequent to the operation 523 illustrated in FIG. 5.

At operation 613, the first node delays further routing the first packet. For example, referring to FIG. 1, the MAC layer of the gateway 116 delays further routing the MAC layer request packet 210.

At operation 616, the first node determines whether the indication for the local exploration is directed to the first node. For example, referring to FIG. 1, the gateway 116 determines whether the exploration MAC address(es) included in the MAC layer request packet 210 is directed to the gateway 116.

When the first node determines that the indication for the local exploration is not directed to the first node, the process proceeds to operation 626. When the first node determines that the indication for the local exploration is directed to the first node, the first node, at operation 619, determines whether the first node has a response packet of the requested information item. For example, referring to FIG. 1, the gateway 116 determines whether it can obtain a copy of the information item 172.

When the first node determines that the first node has a response packet, the first node, at operation 623, transmits a response packet having the requested information item and associated with the first transaction to the second node. For example, referring to FIG. 1, the gateway 116 transmits a MAC layer response packet 250 including the information item 172 to the device 122.

When the first node determines that the first node does not have a response packet, the process proceeds to operation 626.

At operation 626, the first node determines whether a response packet associated with the first transaction is transmitted by another node. In certain configurations, said another node is in the group of nodes. In certain configurations, the response packet includes: an indication of a response and an indication of the first transaction. The determination of whether the response packet associated with the first transaction is transmitted is made based on determining whether a received lower layer packet contains the indication of a response and the indication of the first transaction.

When the first node determines that a response packet associated with the first transaction is not transmitted by another node, the first node, at operation 633, further routes the first packet. For example, referring to FIG. 1, in response to receiving the MAC layer request packet 210 sent from the device 121, the gateway 116 does not detect a MAC layer response packet 250 sent from the devices 122-125 and, thus, further routes the upper layer query packet included in the MAC layer request packet 210 to the information provider 162.

When the first node determines that a response packet associated with the first transaction is transmitted by another node, the first node, at operation 629, drops the first packet. For example, referring to FIG. 1, in response to receiving the MAC layer request packet 210 sent from the device 122, when the gateway 116 detects a MAC layer response packet 250 transmitted by the device 121, the gateway 116 drops the MAC layer request packet 210 received from the device 122.

Figure 7:
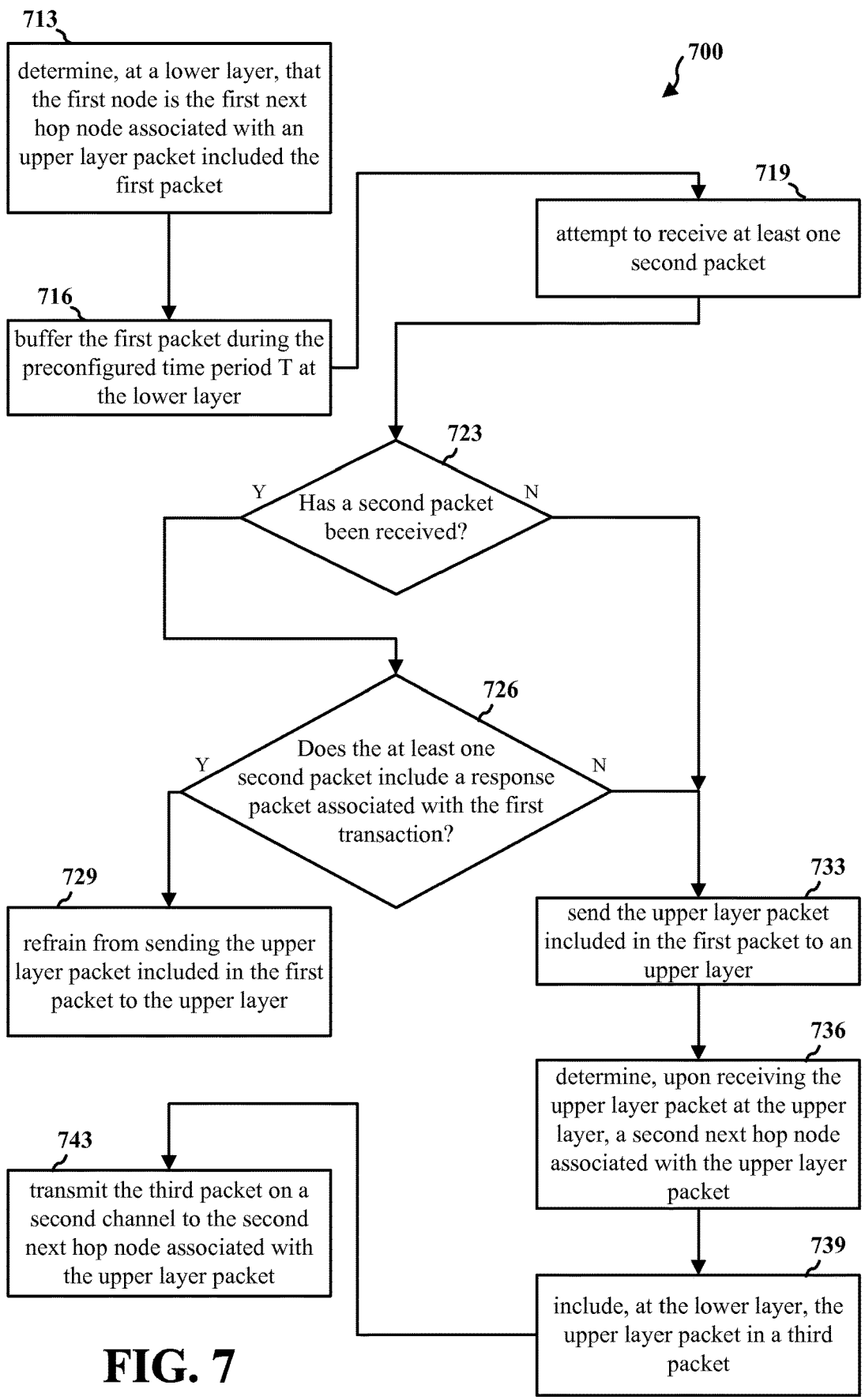
FIG. 7 is a flow chart of another method (process) of local exploration.

FIG. 7 is a flow chart 700 of another method (process) of local exploration. The method may be performed by a first node (e.g., the devices 121-125 and the gateway 116, the apparatus 902/902') subsequent to the operation 519 illustrated in FIG. 5.

In certain configurations, at operation 713, the first node determines, at a lower layer, that the first node is the first next hop node associated with an upper layer packet included the first packet. In certain configurations, the first node, at operation 716, buffers the first packet during a preconfigured time period T at the lower layer in response to determining that the first node is the first next hop node. For example, referring to FIG. 1, the gateway 116 buffers the MAC layer request packet 210 received from the device 122 for a preconfigured time period T.

In certain configurations, the first node, at operation 719, attempts to receive at least one second packet in a preconfigured time period T. In certain configurations, the first packet is received on a channel. The attempting to receive the at least one second packet is performed on the first channel.

In certain configurations, the first node, at operation 723, determines whether the first node has received a second packet. When the first node determines that the first node has not received a second packet, the process proceeds to operation 733. When the first node determines that the first node has received a second packet, the first node, at operation 726, determines whether the at least one second packet includes a response packet associated with the first transaction. When the first node determines that the at least one second packet does not include a response packet associated with the first transaction, the process proceeds to operation 733. For example, referring to FIG. 1, in response to receiving the MAC layer request packet 210 transmitted from the device 121 and not receiving a MAC layer response packet 250 from the exploration nodes, the MAC layer of the gateway 116 sends the upper layer query packet in the MAC layer request packet 210 to the upper layer of the gateway 116.

When the first node determines that the at least one second packet includes a response packet associated with the first transaction, the first node, at operation 729, refrains from sending the upper layer packet included in the first packet to an upper layer. For example, referring to FIG. 1, after receiving and buffering the MAC layer request packet 210 transmitted from the device 122, the MAC layer of the gateway 116 refrains, in response to receiving a MAC layer response packet 250 from the device 121, from sending the upper layer query packet in the MAC layer request packet 210 to the upper layer of the gateway 116.

At operation 733, the first node sends the upper layer packet included in the first packet to the upper layer. At operation 736, the first node determines, upon receiving the upper layer packet at the upper layer, a second next hop node associated with the upper layer packet. At operation 739, the first node includes, at the lower layer, the upper layer packet in a third packet. At operation 743, the first node transmits the third packet on a second channel to the second next hop node associated with the upper layer packet.

Figure 8:
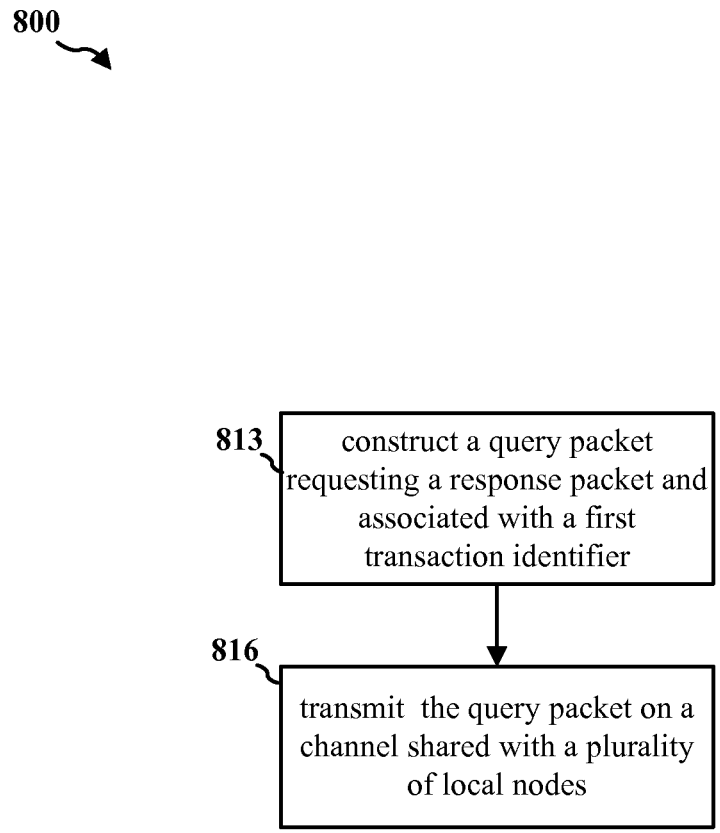
FIG. 8 is a flow chart of a method (process) of operating a querying node.

FIG. 8 is a flow chart 800 of a method (process) of operating a querying node. The method may be performed by a first node (e.g., the devices 121-125 and the gateway 116, the apparatus 902/902').

At operation 813, the first node (i.e., a querying node) constructs a query packet requesting a response packet and associated with a first transaction. The query packet includes an indication for a local exploration and an indication for a targeted request. The response packet includes a requested information item. At operation 816, the first node transmits the query packet on a channel shared with a plurality of local nodes. For example, referring to FIG. 1, the device 122 transmits a MAC layer request packet 210 including a next-hop MAC address and an exploration MAC address(es) on the common channel 132.

In certain configurations, the query packet includes an indication of a query, an indication of the first transaction, at least one first address of a next hop node associated with the targeted request, and at least one second address of a group of nodes associated with the local exploration.

Figure 9:
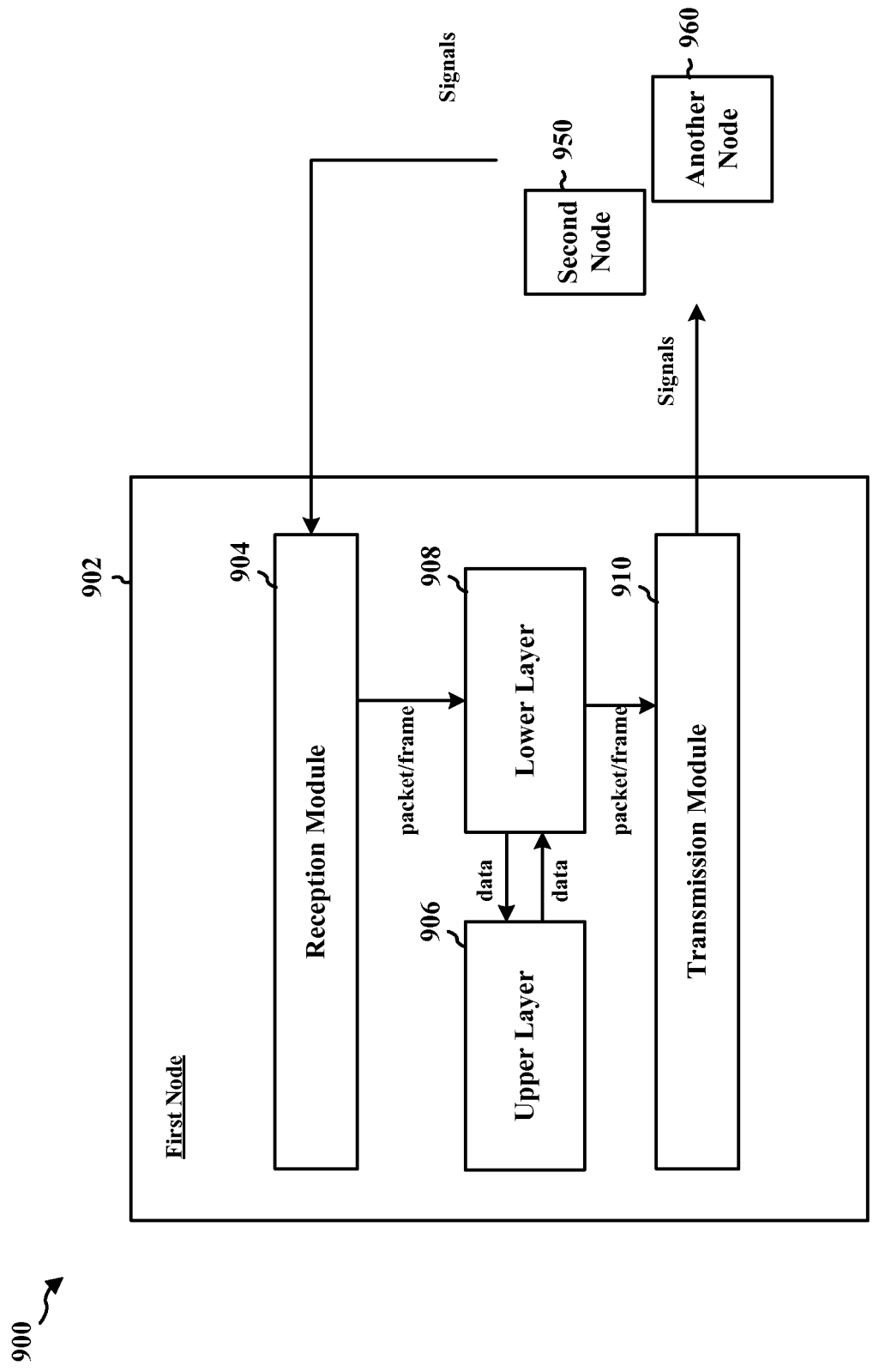
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a first node. The apparatus includes a reception module 904, an upper layer 906, a lower layer 908, and a transmission module 910. The apparatus 902/902' for communication may be configured to receive signals from a second node 950 and another node 960.

In one aspect, the reception module 904 may be configured to receive a first packet from a second node. The lower layer 908 may be configured to determine that the first packet is a query packet requesting a response packet and associated with a first transaction, the response packet having a requested information item. The upper layer 906 and/or the lower layer 908 may be configured to determine that the first node is a first next hop node associated with the first packet. The lower layer 908 may be configured to determine that the query packet includes an indication for a local exploration. The lower layer 908 may be configured to delay further routing the first packet.

In certain configurations, the lower layer 908 may be configured to delay further routing the first packet in response to determining that the first node is the first next hop node associated with the first packet. The reception module 904 and/or the lower layer 908 may be configured to determine whether a response packet associated with the first transaction is transmitted by another node. The upper layer 906 and/or the lower layer 908 may be configured to further route the first packet in response to determining that the response packet associated with the first transaction is not transmitted by said another node. The lower layer 908 may be configured to drop the first packet in response to determining that the response packet associated with the first transaction is transmitted by said another node.

In certain configurations, the query packet includes an indication of a query, an indication of the first transaction, at least one first address of the first next hop node, and at least one second address of a group of nodes. The determination that the first packet is the query packet is based on the indication of the query. The determination that the first node is the first next hop node is based on the first address. Said another node is in the group of nodes. In certain configurations, the response packet includes an indication of a response and an indication of the first transaction. The determination of whether the response packet associated with the first transaction is transmitted is made based on determining whether a received lower layer packet contains the indication of a response and the indication of the first transaction.

In certain configurations, the lower layer 908 may be configured to determine that the first node is the first next hop node associated with an upper layer packet included the first packet. In certain configurations, the lower layer 908 may be configured to attempt to receive at least one second packet. The lower layer 908 may be configured to determine whether the at least one second packet includes a response packet associated with the first transaction in response to receiving the at least one second packet. The lower layer 908 may be configured to send the upper layer packet included in the first packet to an upper layer in response to not receiving the at least one second packet or in response to determining that the at least one second packet does not include a response packet associated with the first transaction. The lower layer 908 may be configured to, in response to determining that the at least one second packet includes a response packet associated with the first transaction, refrain from sending the upper layer packet included in the first packet to the upper layer or refrain from sending a response packet received from the upper layer to the second node.

In certain configurations, the lower layer 908 may be configured to receive the at least one second packet in a preconfigured time period T. The lower layer 908 may be configured to buffer the first packet during the preconfigured time period T at the lower layer in response to determining that the first node is the first next hop node. In certain configurations, the upper layer 906 and/or the lower layer 908 may be configured to determine, upon receiving the upper layer packet at the upper layer, a second next hop node associated with the upper layer packet. The lower layer 908 may be configured to include the upper layer packet in a third packet. The lower layer 908 and/or the transmission module 910 may be configured to transmit the third packet on a second channel to the second next hop node associated with the upper layer packet.

In another aspect, the upper layer 906 and/or the lower layer 908 may be configured to construct a query packet requesting a response packet and associated with a first transaction. The query packet includes an indication for a local exploration and an indication for a targeted request. The lower layer 908 and/or the transmission module 910 may be configured to transmit the query packet on a channel shared with a plurality of local nodes.

In certain configurations, the query packet includes an indication of a query, an indication of the first transaction, at least one first address of a next hop node associated with the targeted request, and at least one second address of a group of nodes associated with the local exploration.

Figure 10:
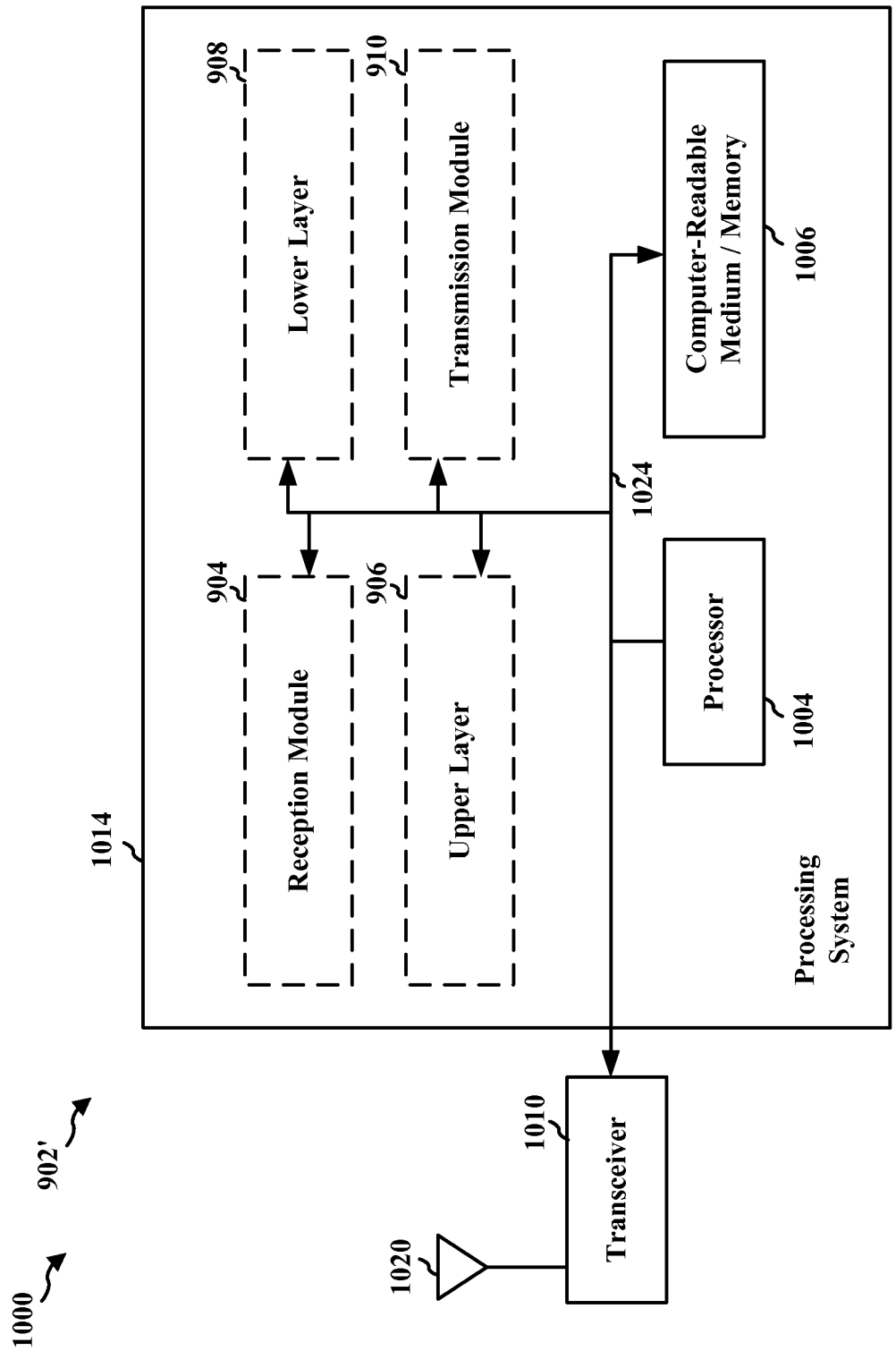
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides means for communicating with various other apparatus over a transmission medium. The transceiver 1010 receives a signal from the one or more antennas 1020, extracts information from the received signal, and provides the extracted information to the processing system 1014, specifically the reception module 904. In addition, the transceiver 1010 receives information from the processing system 1014, specifically the transmission module 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 904, 906, 908, and 910. The modules may be software modules running in the processor 1004, resident/stored in the computer readable medium/memory 1006, one or more hardware modules coupled to the processor 1004, or some combination thereof.

The processing system 1014 may be a component of the devices 121-125 and the gateway 116. In one configuration, the apparatus 902/902' for communication includes means for performing operations illustrated in FIGS. 5-8.

Specifically, in one aspect, the apparatus 902/902' includes means for receiving a first packet from a second node. The apparatus 902/902' includes means for determining that the first packet is a query packet requesting a response packet and associated with a first transaction, the response packet having a requested information item. The apparatus 902/902' includes means for determining that the first node is a first next hop node associated with the first packet. The apparatus 902/902' includes means for determining that the query packet includes an indication for a local exploration. The apparatus 902/902' includes means for delaying further routing the first packet.

The means for determining that the first packet is a query packet may be configured to perform the determination at a lower layer. The lower layer is a PHY layer, a MAC layer, or a LINK layer.

The apparatus 902/902' may be configured to include means for delaying further routing the first packet in response to determining that the first node is the first next hop node associated with the first packet. The apparatus 902/902' may be configured to include means for determining whether a response packet associated with the first transaction is transmitted by another node. The apparatus 902/902' may be configured to include means for further routing the first packet in response to determining that the response packet associated with the first transaction is not transmitted by said another node. The apparatus 902/902' may be configured to include means for dropping the first packet in response to determining that the response packet associated with the first transaction is transmitted by said another node.

The query packet may includes an indication of a query, an indication of the first transaction, at least one first address of the first next hop node, and at least one second address of a group of nodes. The determination that the first packet is the query packet may be based on the indication of the query. The determination that the first node is the first next hop node may be based on the first address. Said another node may be in the group of nodes.

The response packet may include an indication of a response, an indication of the first transaction. The determination of whether the response packet associated with the first transaction is transmitted may be made based on determining whether a received lower layer packet contains the indication of a response and the indication of the first transaction.

The apparatus 902/902' may be configured to include means for determining, at a lower layer, that the first node is the first next hop node associated with an upper layer packet included the first packet. The apparatus 902/902' may be configured to include means for attempting to receive at least one second packet. The apparatus 902/902' may be configured to include means for determining whether the at least one second packet includes a response packet associated with the first transaction in response to receiving the at least one second packet. The apparatus 902/902' may be configured to include means for sending the upper layer packet included in the first packet to an upper layer in response to not receiving the at least one second packet or in response to determining that the at least one second packet does not include a response packet associated with the first transaction. The apparatus 902/902' may be configured to include means for refraining from sending the upper layer packet included in the first packet to the upper layer in response to determining that the at least one second packet includes a response packet associated with the first transaction or means for refraining from sending a response packet received from the upper layer to the second node in response to determining that the at least one second packet includes a response packet associated with the first transaction.

The attempting to receive the at least one second packet is performed in a preconfigured time period T. The apparatus 902/902' may be configured to include means for buffering the first packet during the preconfigured time period T at the lower layer in response to determining that the first node is the first next hop node. The first packet may be received on a first channel. The attempting to receive the at least one second packet may be performed on the first channel.

The apparatus 902/902' may be configured to include means for determining, upon receiving the upper layer packet at the upper layer, a second next hop node associated with the upper layer packet. The apparatus 902/902' may be configured to include means for including, at the lower layer, the upper layer packet in a third packet. The apparatus 902/902' may be configured to include means for transmitting the third packet on a second channel to the second next hop node associated with the upper layer packet.

In another aspect, the apparatus 902/902' includes means for constructing a query packet requesting a response packet and associated with a first transaction. The query packet includes an indication for a local exploration and an indication for a targeted request. The apparatus 902/902' includes means for transmitting the query packet on a channel shared with a plurality of local nodes.

The query packet may include an indication of a query, an indication of the first transaction, at least one first address of a next hop node associated with the targeted request, and at least one second address of a group of nodes associated with the local exploration.

The aforementioned means may be one or more of the aforementioned modules of the apparatus 902 and/or the processing system 1014 of the apparatus 902' configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communication at a first node, comprising:
   receiving a first packet from a second node;
   determining that the first packet is a query packet requesting a response packet associated with a first transaction;
   determining, at a lower layer, that the first node is a first next hop node associated with an upper layer packet included in the first packet;
   determining that the query packet includes an indication for a local exploration based on an exploration address indicated in the first packet, wherein the local exploration comprises a local exploration node transmitting a response in response to the query packet; and
   delaying, in response to determining that the query packet includes the indication for the local exploration based on the exploration address and in response to determining that the first packet indicates a next hop address associated with the first node, further routing of the first packet for a preconfigured amount of time to listen for the response from the local exploration node in response to the query packet.

2. The method of claim 1, wherein the determination that the first packet is the query packet is performed at one or more of a physical (PHY) layer, a medium access control (MAC) layer, or a LINK layer.

3. The method of claim 1, further comprising:
   determining whether the response packet associated with the first transaction is transmitted by another node;
   further routing the first packet in response to determining that the response packet associated with the first transaction is not transmitted by said another node; and
   dropping the first packet in response to determining that the response packet associated with the first transaction is transmitted by said another node.

4. The method of claim 3, wherein the query packet includes an indication of a query;
   wherein the determination that the first packet is the query packet is based on the indication of the query; wherein the determination that the first node is the first next hop node is based on the first next hop address; and wherein said another node is associated with the exploration address.

5. The method of claim 3, wherein the response packet includes an indication of the response, and an indication of the first transaction; and
   wherein the determination of whether the response packet associated with the first transaction is transmitted by said another node is based on determining whether a received lower layer packet contains the indication of the response and the indication of the first transaction.

6. The method of claim 1, wherein the next hop address comprises a unicast address and the exploration address comprises a broadcast address.

7. The method of claim 1, wherein the first packet includes a transaction identifier (ID) that indicates the next hop address and the exploration address.

8. A method of communication at a first node, comprising:
   receiving a first packet from a second node;
   determining that the first packet is a query packet requesting a response packet and associated with a first transaction;

determining, at a lower layer, that the first node is a first next hop node associated with an upper layer packet included in the first packet;
determining that the query packet includes an indication for a local exploration; delaying further routing the first packet;
attempting to receive at least one second packet;
determining whether the at least one second packet includes a response packet associated with the first transaction in response to receiving the at least one second packet; and
sending the upper layer packet included in the first packet to an upper layer in response to not receiving the at least one second packet or in response to determining that the at least one second packet does not include a response packet associated with the first transaction; or
in response to determining that the at least one second packet includes the response packet associated with the first transaction, (a) refraining from sending the upper layer packet included in the first packet to the upper layer or (b) refraining from sending a response packet received from the upper layer to the second node.

9. The method of claim 8, wherein the attempting to receive the at least one second packet is performed in a preconfigured time period T, the method further comprising buffering the first packet during the preconfigured time period T at the lower layer in response to determining that the first node is the first next hop node.

10. The method of claim 8, wherein the first packet is received on a first channel, and wherein the attempting to receive the at least one second packet is performed on the first channel.

11. The method of claim 10, further comprising:
determining, upon receiving the upper layer packet at the upper layer, a second next hop node associated with the upper layer packet;
including, at the lower layer, the upper layer packet in a third packet; and
transmitting the third packet on a second channel to the second next hop node associated with the upper layer packet.

12. An apparatus for communication, the apparatus being a first node, comprising:
means for receiving a first packet from a second node;
means for determining that the first packet is a query packet requesting a response packet associated with a first transaction;
means for determining, at a lower layer, that the first node is a first next hop node associated with an upper layer packet included in the first packet;
means for determining that the query packet includes an indication for a local exploration based on an exploration address indicated in the first packet, wherein the local exploration comprises a local exploration node transmitting a response in response to the query packet; and
means for delaying, in response to determining that the query packet includes the indication for the local exploration based on the exploration address and further in response to determining that the first packet indicates a next hop address associated with the first node, further routing the of first packet for a preconfigured amount of time to listen for the response from the local exploration node in response to the query packet.

13. The apparatus of claim 12, wherein the means for determining that the first packet is a query packet is configured at one or more of a physical (PHY) layer, a medium access control (MAC) layer, or a LINK layer.

14. The apparatus of claim 12, further comprising:
means for determining whether the response packet associated with the first transaction is transmitted by another node;
means for further routing the first packet in response to determining that the response packet associated with the first transaction is not transmitted by said another node; and
means for dropping the first packet in response to determining that the response packet associated with the first transaction is transmitted by said another node.

15. The apparatus of claim 14, wherein the query packet includes an indication of a query;
wherein the determination that the first packet is the query packet is based on the indication of the query;
wherein the determination that the first node is the first next hop node is based on the next hop address; and
wherein said another node is associated with the exploration address.

16. The apparatus of claim 14, wherein the response packet includes an indication of the response, and an indication of the first transaction; and
wherein the determination of whether the response packet associated with the first transaction is transmitted by said another node is based on determining whether a received lower layer packet contains the indication of the response and the indication of the first transaction.

17. An apparatus for communication, the apparatus being a first node, comprising:
means for receiving a first packet from a second node;
means for determining that the first packet is a query packet requesting a response packet and associated with a first transaction;
means for determining, at a lower layer, that the first node is a first next hop node associated with an upper layer packet included in the first packet;
means for determining that the query packet includes an indication for a local exploration;
means for delaying further routing the first packet;
means for attempting to receive at least one second packet;
means for determining whether the at least one second packet includes a response packet associated with the first transaction in response to receiving the at least one second packet; and
means for sending the upper layer packet included in the first packet to an upper layer in response to not receiving the at least one second packet or in response to determining that the at least one second packet does not include a response packet associated with the first transaction; or
means for (a) refraining from sending the upper layer packet included in the first packet to the upper layer in response to determining that the at least one second packet includes the response packet associated with the first transaction or (b) refraining from sending a response packet received from the upper layer to the second node in response to determining that the at least one second packet includes the response packet associated with the first transaction.

18. The apparatus of claim 17, wherein the attempting to receive the at least one second packet is performed in a preconfigured time period T, the apparatus further comprising means for buffering the first packet during the preconfigured time period T at the lower layer in response to determining that the first node is the first next hop node.

19. The apparatus of claim 17, wherein the first packet is received on a first channel, and wherein the attempting to receive the at least one second packet is performed on the first channel.

20. The apparatus of claim 19, further comprising:
means for determining, upon receiving the upper layer packet at the upper layer, a second next hop node associated with the upper layer packet;
means for including, at the lower layer, the upper layer packet in a third packet; and means for transmitting the third packet on a second channel to the second next hop node associated with the upper layer packet.

21. An apparatus for communication, the apparatus being a first node, comprising:
a memory; and
at least one processor coupled to the memory and configured to:
receive a first packet from a second node;
determine that the first packet is a query packet requesting a response packet associated with a first transaction;
determine, at a lower layer, that the first node is a first next hop node associated with an upper layer packet included in the first packet;
determine that the query packet includes an indication for a local exploration based on an exploration address indicated in the first packet, wherein the local exploration comprises a local exploration node transmitting a response in response to the query packet; and
delay, in response to determining that the query packet includes the indication for the local exploration based on the exploration address and in response to determining that the first packet indicates a next hop address associated with the first node, further routing of the first packet for a preconfigured amount of time to listen for the response from the local exploration node in response to the query packet.

22. The apparatus of claim 21, wherein the at least one processor is further configured to:
determine whether the response packet associated with the first transaction is transmitted by another node;
further route the first packet in response to determining that the response packet associated with the first transaction is not transmitted by said another node; and
drop the first packet in response to determining that the response packet associated with the first transaction is transmitted by said another node.

23. The apparatus of claim 22, wherein the query packet includes an indication of a query;
wherein the determination that the first packet is the query packet is based on the indication of the query;
wherein the determination that the first node is the first next hop node is based on the first next hop address; and wherein said another node is associated with the exploration address.

24. The apparatus of claim 22, wherein the response packet includes an indication of a response, and an indication of the first transaction; and
wherein the determination of whether the response packet associated with the first transaction is transmitted by said another node is based on determining whether a received lower layer packet contains the indication of the response and the indication of the first transaction.

25. An apparatus for communication, the apparatus being a first node, comprising:
a memory; and
at least one processor coupled to the memory and configured to:
receive a first packet from a second node;
determine that the first packet is a query packet requesting a response packet and associated with a first transaction;
determine, at a lower layer, that the first node is a first next hop node associated with an upper layer packet included in the first packet;
determine that the query packet includes an indication for a local exploration; and delay further routing the first packet;
attempt to receive at least one second packet;
determine whether the at least one second packet includes a response packet associated with the first transaction in response to receiving the at least one second packet; and
send the upper layer packet included in the first packet to an upper layer in response to not receiving the at least one second packet or in response to determining that the at least one second packet does not include a response packet associated with the first transaction; or in response to determining that the at least one second packet includes the response packet associated with the first transaction, (a) refrain from sending the upper layer packet included in the first packet to the upper layer or (b) refrain from sending a response packet received from the upper layer to the second node.

26. The apparatus of claim 25, wherein the at least one processor is further configured to:
attempt to receive the at least one second packet in a preconfigured time period T, and buffer the first packet during the preconfigured time period T at the lower layer in response to determining that the first node is the first next hop node.

27. The apparatus of claim 25, wherein the first packet is received on a first channel, wherein the attempting to receive the at least one second packet is performed on the first channel, and wherein the at least one processor is further configured to:
determine, upon receiving the upper layer packet at the upper layer, a second next hop node associated with the upper layer packet;
include, at the lower layer, the upper layer packet in a third packet; and
transmit the third packet on a second channel to the second next hop node associated with the upper layer packet.

* * * * *